United States Patent
Sevindik et al.

(10) Patent No.: US 11,777,561 B2
(45) Date of Patent: Oct. 3, 2023

(54) POWER BUDGET CONTROL VIA BEAMFORMING IN A WIRELESS NETWORK

(71) Applicant: Charter Communications Operating, LLC, St. Louis, MO (US)

(72) Inventors: Volkan Sevindik, Reston, VA (US); Mohammedyusuf M. Shaikh, Denver, CO (US); Haider H. Syed, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 17/510,765

(22) Filed: Oct. 26, 2021

(65) Prior Publication Data

US 2023/0125174 A1    Apr. 27, 2023

(51) Int. Cl.
H04B 7/06       (2006.01)
H04B 7/0426     (2017.01)
H04B 7/0408     (2017.01)

(52) U.S. Cl.
CPC .......... H04B 7/043 (2013.01); H04B 7/0408 (2013.01)

(58) Field of Classification Search
CPC ..... H04B 7/043; H04B 7/0408; H04B 7/0617
See application file for complete search history.

(56) References Cited

U.S. PATENT DOCUMENTS

| | | | |
|---|---|---|---|
| 10,720,978 B1 * | 7/2020 | Sun | H04L 5/0073 |
| 2018/0269945 A1 * | 9/2018 | Zhang | H04B 7/0695 |
| 2020/0374856 A1 * | 11/2020 | Sarajlic | H04B 7/0695 |
| 2021/0051495 A1 * | 2/2021 | Gupta | H04W 72/1231 |
| 2021/0175919 A1 * | 6/2021 | Badic | H04B 7/0897 |
| 2022/0007207 A1 * | 1/2022 | Raghavan | H04W 16/28 |
| 2022/0021427 A1 * | 1/2022 | Mirzaee | H04B 7/0617 |
| 2022/0078734 A1 * | 3/2022 | Zhang | H04L 5/16 |
| 2022/0248218 A1 * | 8/2022 | Zach | H04B 7/0882 |

* cited by examiner

Primary Examiner — Kenneth T Lam
(74) Attorney, Agent, or Firm — Armis IP Law, LLC

(57) ABSTRACT

A communication system includes communication management hardware to control operation of first antenna hardware and second antenna hardware associated with a wireless base station. For example, in one arrangement, via control provided by the communication management hardware, the first antenna hardware transmits a first sidelobe wireless beam; the second antenna hardware transmits a second sidelobe wireless beam. The first sidelobe wireless beam and the second sidelobe wireless beam provide a communication device access to a remote network.

30 Claims, 12 Drawing Sheets

POWER BUDGET CONTROL VIA BEAMFORMING IN A WIRELESS NETWORK

BACKGROUND

Conventional wireless networks typically include one or more wireless base stations to provide mobile communication devices access to a remote network such as the Internet. One type of base station is a so-called CBSD (Citizen Broadband Radio Service Device). Such a device uses a wireless channel allocated from a CBRS (Citizens Band Radio Service) to support communications with one or more mobile communication devices.

Typically, one or more wireless channels is allocated to a base station by a SAS (Spectrum Access System) to support communications with one or more mobile communication devices or so-called customer premises equipment. For example, a base station can be configured to communicate with the SAS to receive notification of one or more wireless channels allocated for its use.

Subsequent to registration and wireless channel allocation, the wireless base station communicates so-called heartbeat request messages to the spectrum access system in order to continue use of the allocated one or more wireless channels. For example, the customer premises equipment is able to continue using the allocated wireless channel if the SAS communicates a heartbeat response to the customer premises equipment.

In a CBRS system, the SAS (Spectrum Access System) is used to allocate (authorize/unauthorize) radio resources to CBSDs based on request from CBSD; the spectrum allocation/grant to the CBSD can be in a chunks of 10 MHz or 20 MHz and up to 100 MHz assuming LTE operation.

Conventional carrier aggregation (CA) includes implementing two frequency bands to receive and send data to/from a CBSD. Currently, there are no wireless communication chipsets that support carrier aggregation. For example, existing chipsets do not support carrier aggregation today, and for that reason, it is not possible to combine two 20 MHz carriers to deliver superior downlink speeds to respective mobile users.

BRIEF DESCRIPTION OF EMBODIMENTS

Embodiments herein are motivated to provide carrier aggregation via implementation of multiple chip sets. For example, in one embodiment, communication management hardware includes multiple chipsets to support generation of wireless base station from multiple instances of antenna hardware, each communicating via at least one assigned wireless channel. In certain instances, each chipset supports one sector of CBSD; that means there is one RF signal supplied by each chipset.

Embodiments herein provide novel ways of providing improved wireless communications to one or more communication devices in a network environment.

More specifically, in one embodiment, a communication system such as associated with a wireless base station includes communication management hardware to control operation of first antenna hardware and second antenna hardware. In one embodiment, via control provided by the communication management hardware, the first antenna hardware transmits a first main lobe wireless beam and corresponding first sidelobe wireless beam; the second antenna hardware transmits a second main lobe wireless beam and corresponding second sidelobe wireless beam. The first sidelobe wireless beam and the second sidelobe wireless beam provide a communication device access to a remote network.

In further example embodiments, the first antenna hardware transmits a first main lobe wireless beam, the first sidelobe wireless beam being a sidelobe with respect to the first main lobe wireless beam; and the second antenna hardware transmits a second main lobe wireless beam, the second sidelobe wireless beam being incidental to transmitting the second main lobe wireless beam.

The first and/or second sidelobe provide connectivity to any suitable number of communication devices. For example, in one embodiment, the first sidelobe wireless beam supports a first number of mobile communication devices; the first main lobe wireless beam supports a second number of mobile communication devices. In such an instance, the communication management hardware controls a magnitude of a power level of the first sidelobe with respect to the first main lobe depending on a ratio of the first number of mobile communication devices with respect to second number of mobile communication devices.

Further embodiments herein include, via the communication management hardware, determining a first number of mobile communication devices provided wireless access to the remote network via the first sidelobe wireless beam and the first main lobe wireless beam; determining a second number of mobile communication devices provided wireless access to the remote network via the second sidelobe wireless beam and the second main lobe wireless beam; and adjusting an apportionment of power allocated to transmit the first sidelobe wireless beam and the first main lobe wireless beam versus the second sidelobe wireless beam and the second main lobe wireless beam based on the ratio.

In still further example embodiments, the first sidelobe wireless beam is transmitted at a first wireless carrier frequency; the second sidelobe wireless beam is transmitted at a second wireless carrier frequency.

Still further example embodiments herein include, via the communication management hardware or other suitable entity, controlling a first power level of transmitting the first sidelobe wireless beam and a second power level of transmitting the second sidelobe wireless beam based on a number of mobile communication devices provided access to the remote network via the first sidelobe wireless beam and the second sidelobe wireless beam.

In yet further example embodiments, the mobile communication device implements carrier aggregation to communicate with the remote network over both the first sidelobe wireless beam and the second sidelobe wireless beam.

In accordance with still further example embodiments, the first antenna hardware supports first communications managed by first communication management hardware; the second antenna hardware supports second communications managed by second communication management hardware. The communication management hardware apportions first power to the first communication management hardware and the second communication management hardware depending on a ratio of a number of communication devices supported by the first antenna hardware with respect to a number of communication devices supported by the second antenna hardware. In one embodiment, the first antenna hardware and the second antenna hardware reside in a same wireless base station.

Yet further embodiments herein include, via the communication management hardware, adjusting a power level of transmitting the first sidelobe wireless beam, adjustment of the power level changing an overlap of a first wireless coverage region provided by the first sidelobe wireless beam with respect to a second wireless coverage region provided by the second sidelobe wireless beam. In one embodiment, increased overlap of the first sidelobe wireless beam and the second sidelobe wireless beam enables one or more mobile communication devices to communicate with a remote network via implementation of carrier aggregation. That is, the mobile communication devices in the common regions of wireless coverage provided by the first sidelobe wireless beam and the second sidelobe wireless beam each use multiple wireless carrier frequencies to receive communications from one or more wireless base stations.

In accordance with more specific embodiments, the
1. CBSD1 (e.g., wireless base station, wireless access point, etc.) powers ON and connects with a respective spectrum access system for allocation of one or more wireless channels.
2. The spectrum access system grants spectrum (multiple wireless channels) to the CBSD1.
3. The CBSD1 implements two sectors, each of which is managed by a different chipset.
4. Each chipset of the communication system as discussed herein manages single sector of CBSD, and antennas (antenna hardware) connected to each sector are identical.
5. Each of the chipsets starts sending a respective wireless RF signal over the air via the different antenna hardware; there is at least a partial overlap between sidelobe regions of wireless coverage. Mobile communication devices or UEs (instances of user equipment) in the coverage of two sidelobes will detect and measure the RF signals coming from these sidelobes.
6. The CBSD1 determines how many UEs are connected to each of the different instances of antenna hardware (such as supporting different RF signals at the same time). The CBSDs knows the number of users that are connected to each signal RF beam (sidelobe or main lobe). In one embodiment, the CBSD1 operates as follows:
 a) CBSD1 will check if the number of total UEs served by two RF signals are larger than the number of UEs served by each sector. If that is the case, CBSD1 will increase the power of side lobes, and that will increase respective region of wireless coverage provided by the overlapped region. In such an instance, more UEs are present in an overlap region of wireless coverage and operate in the carrier aggregation mode, and receive superior/better downlink speeds. Such a process can be implemented for individual sectors. For instance, if the number of users served by RF signal 1 a transmitted by sector 1 is very low compared to users served in sidelobe overlapped regions, then CBSD increases the side lobe power of antenna 1 of sector 1 only. Any antenna pattern (sidelobe) of sector 2 will stay at the same power the same since the main lobe of sector 2 serves a much higher number of users than being served by the sidelobe of sector 2.
 b) In one embodiment, the increment of signal power associated with a sidelobe is proportional to CPU (Central Processing Unit) resources dedicated to providing connectivity to the mobile communication devices. For instance, if CPU1 serving sector 1 and generating RF signal 1 uses 60% of its resources to serve the UEs connected to the main lobe of sector 1, then the CPU1 can only use 40% of its resources to serve UEs in the carrier aggregation mode in the overlapping sidelobe regions.
 c) If an increasing number of mobile communication devices need access in the overlapping sidelobe regions of one or more wireless base stations, then the CPUs (communication management resources) dedicate more of their processing power to serve respective UEs in the sidelobe overlapped region. As the amount of resources is increased to provide connectivity via the sidelobes and carrier aggregation mode, the sidelobe power is also increased to serve the additional UEs in the overlapped region till some processing threshold. For instance, in one embodiment, the side lobe power can increase up to 90% of total processing capacity of CPU1, which is dedicated to server UEs in the overlapped region.
 d) This process will continue as long as CBSD is power on and has spectrum granted.

Embodiments herein are useful over conventional techniques. For example, embodiments herein include unique ways of providing efficient use of wireless services via multiple sidelobe wireless beams.

Note further that any of the resources as discussed herein can include one or more computerized devices, communication management resources, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (such as any computer readable hardware storage medium, computer readable storage hardware, etc.) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage hardware medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed on a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate wireless communications and handoffs in a network environment. The instructions, when executed by computer processor hardware, cause the computer processor hardware (such as one or more co-located or disparately processor devices or hardware) to: transmit a first sidelobe wireless beam from first antenna hardware; transmit a second sidelobe wireless beam from second antenna hardware; and utilize the first sidelobe wireless beam and the second sidelobe wireless beam to provide a communication device access to a remote network.

Note that the ordering of the steps above has been added for clarity sake. Further note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing communication services. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
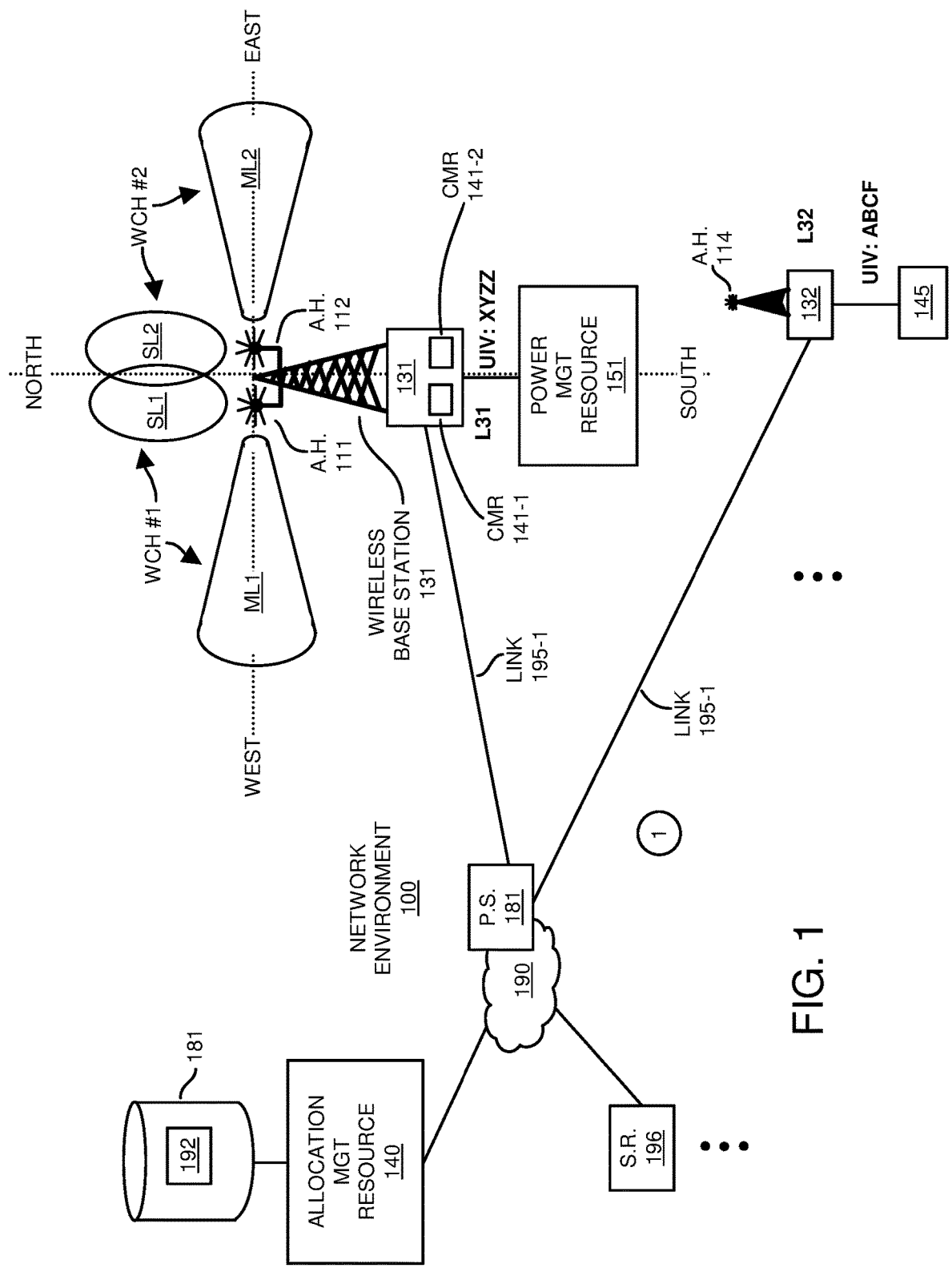
FIG. 1 is an example diagram illustrating a communication network environment and multiple wireless base stations implementing multi-lobe communications according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

As further discussed herein, a communication system such as associated with a wireless base station includes a communication management resource to control operation of first antenna hardware and second antenna hardware. In one embodiment, via control provided by the communication management resource, the first antenna hardware transmits a first main lobe wireless beam and corresponding first sidelobe wireless beam; the second antenna hardware transmits a second main lobe wireless beam and corresponding second sidelobe wireless beam. The first sidelobe wireless beam and the second sidelobe wireless beam provide a communication device access to a remote network.

Now, more specifically, with reference to the drawings, FIG. 1 is an example diagram illustrating multiple wireless base stations implementing multi-lobe communications according to embodiments herein.

As shown, network environment 100 includes allocation management resource 140 (such as spectrum access system), wireless base station 131, wireless base station 132, etc., power management resource 151, etc.

Wireless network environment 100 includes any number of wireless base stations and corresponding power management resources. Wireless network environment 100 further includes network 190, server resource 196, etc. Shared communication link 195-1 supports connectivity between the wireless base station 131, 132, etc., and the remote network 190.

Each of the wireless base stations includes respective one or more instances of antenna hardware to wirelessly communicate with mobile communication devices (a.k.a., user equipment). For example, in this embodiment, the wireless base station 131 includes at least antenna hardware 111 (such as one or more antenna elements), antenna hardware 112 (such as one or more antenna elements), etc.

Note that each of the resources in network environment 100 can be configured to include or be configured as appropriate hardware, software, or combination of hardware and software to carry out respective operations as discussed herein.

More specifically, the wireless base station 131 as described herein can be implemented via respective wireless base station hardware, wireless base station software, or a combination of wireless base station hardware and wireless base station software; the power management resource 151 can be implemented via power management hardware, power management software, or a combination of power management hardware and power management software; communication management resource 141 can be implemented via communication management hardware, communication management software, or a combination of communication management hardware and communication management software; communication management resource 141-1 can be implemented via communication management hardware, communication management software, or a combination of communication management hardware and communication management software; communication management resource 141-2 can be implemented via communication management hardware, communication management software, or a combination of communication management hardware and communication management software; allocation management resource 140 can be implemented via allocation management hardware, allocation management software, or allocation management hardware and allocation management software; and so on.

As further shown in this example embodiment, the link 195-1 (such as shared communication link, cable, physical link, etc.) provides connectivity between the wireless base station 131 and the remote network 190; the link 195-1 (such as shared communication link, cable, physical link, etc.) provides connectivity between the wireless base station 132 and the remote network 190; and so on.

As previously discussed, the wireless base station 131 includes communication management resource 141 such as communication management resource 141-1 and communication management resource 141-2.

Communication management resource 141-1 (such as circuitry, multiple semiconductor chips, processors, drivers, logic, etc.) controls transmission and reception of wireless communications from/to the antenna hardware antenna hardware 111. Communication management resource 141-2 (such as circuitry, multiple semiconductor chips, logic, etc.) controls transmission and reception of wireless communications from/to the antenna hardware antenna hardware 112.

In one embodiment, each of the instances of antenna hardware associated with the wireless base station 131 support wireless beamforming. For example, the first antenna hardware 111 includes any number of antenna elements to support wireless beamforming in any suitable direction with respect to the wireless base station 131. Additionally, the antenna hardware 112 includes any number of antenna elements to support wireless beamforming in any suitable direction.

As shown in FIG. 1, the communication management resource 141-1 controls driving/monitoring the antenna elements in the antenna hardware 111 to support a main lobe wireless beam ML1 (to receive and transmit wireless signals) pointed in a westerly direction with respect to the wireless base station 131. In this example embodiment, generation of the main lobe wireless beam ML1 from antenna hardware 111 results in incidental generation of the sidelobe wireless beam SL1 (to receive and transmit wireless signals) from the antenna hardware 111 in a northerly direction.

The communication management resource 141-2 controls driving the antenna elements in the antenna hardware 112 to support a main lobe wireless beam ML2 (to receive and transmit wireless signals) pointed in an easterly direction with respect to the wireless base station 131. In this example embodiment, generation of the main lobe wireless beam ML2 from antenna hardware 112 results in incidental generation of the sidelobe wireless beam SL2 (to receive and transmit wireless signals) from the antenna hardware 112 in a northerly direction.

In one nonlimiting example embodiment, there is a null (or region of diminished irradiance) supporting no wireless signals with respect to the wireless base station 131 between main lobe wireless beam ML1 and the sidelobe wireless beam SL1; there is a null (or region of diminished irradiance) supporting no wireless signals with respect to the wireless base station 132 between main lobe wireless beam ML2 and the sidelobe wireless beam SL2.

Thus, via control provided by the communication management resource 141 (such as communication management resource 141-1 and communication management resource 141-2), the first antenna hardware 111 transmits a first main lobe wireless beam ML1 and corresponding first sidelobe wireless beam SL1; the second antenna hardware 112 transmits a second main lobe wireless beam ML2 and corresponding second sidelobe wireless beam SL2.

As further discussed herein, the first sidelobe wireless beam SL1 and the second sidelobe wireless beam SL2 provide one or more communication devices such as including the communication device 161 access to a remote network 190.

The wireless network and corresponding wireless base station 131 as discussed herein can be configured to support any suitable wireless communication protocols. For example, in one embodiment, each of the wireless base stations (i.e., wireless stations, wireless access points, etc.) in network environment 100 can be configured to implement one or more wireless communication protocols such as Wi-Fi™, LTE communications, cellular communications, 4G communications, 5G communications, New Radio, etc.

In still further example embodiments, note that the wireless base station 131 can be configured to operate in the CBRS band. For example, in one embodiment, the wireless base station 131 registers with the allocation management resource 140 (such as a spectrum access system) for allocation of one or more wireless channels to communicate in the network environment 100. In one embodiment, the allocation management resource 140 allocates wireless channel WCH #1 and wireless channel WCH #2 for use by the wireless base station 131.

Subsequent to allocation, the wireless base station 131 uses the first allocated wireless channel WCH #1 (i.e., a first wireless carrier frequency) to support/generate main lobe wireless beam ML1 and sidelobe wireless beam SL1; the wireless base station 131 uses the second allocated wireless channel WCH #2 (i.e., a second wireless carrier frequency) to support/generate main lobe wireless beam ML2 and sidelobe wireless beam SL2. In such an instance, the sidelobe wireless beam SL1 is transmitted at a first carrier frequency (WCH #1); the second sidelobe wireless beam SL2 is transmitted at a second carrier frequency (WCH #2).

Each of the mobile communication devices within region of wireless coverage provided by the main lobe wireless beam ML1 are able to communicate with the wireless base station 131 via the first wireless channel WCH #1 and not the second wireless channel WCH #2.

Each of the mobile communication devices within region of wireless coverage provided by the main lobe wireless beam ML2 are able to communicate with the wireless base station 131 via the second wireless channel WCH #2 and not the first wireless channel WCH #1.

In yet further example embodiments, the mobile communication device 151 (and one or more other mobile communication devices) residing in both the region of wireless coverage provided by the sidelobe wireless beam SL1 and region of wireless coverage provided by sidelobe wireless beam SL2 is able to communicate using wireless channel WCH #1 and wireless channel WCH #2 and implements carrier aggregation to communicate with the remote network 190.

More specifically, in one embodiment, the mobile communication device 151 establishes simultaneous connectivity with the wireless base station 131 via both the first wireless channel WCH #1 and the second wireless channel WCH #2. Implementation of so-called carrier aggregation when possible (such as via sidelobe wireless beam SL1 and sidelobe wireless beam SL2) enables higher uplink and downlink data rates to the mobile communication device 151 than provided by the main lobe wireless beam ML1 or main lobe wireless beam ML2 to mobile communication devices in the east or west direction.

As further discussed herein, the power management resource 151 controls power consumption by each of the one or more wireless base stations and corresponding communication management resources. For example, in one embodiment, the wireless base station 131 is allocated use of a limited amount of power to communicate with one or more mobile communication devices.

The power supplied to power the wireless base station 131 can be conveyed in any suitable manner. In one embodiment, a power supply 181 such as located in or associated with the network 190 provides power over the link 195-1 (such as a cable, physical link, one or more wires, etc.) to the wireless base station 131. In further example embodiments, the power supply 181 is limited as to how much power it is able to supply over the link 195-1 to the respective one or more wireless base stations 131, 132, etc. The limitations may be based on a limited capability of the link 195-1 to convey power, inability of a power supply to supply power, etc.

Examples of providing main lobe and sidelobe connectivity as well as different aspects of power consumption control are further discussed below.

Figure 2:
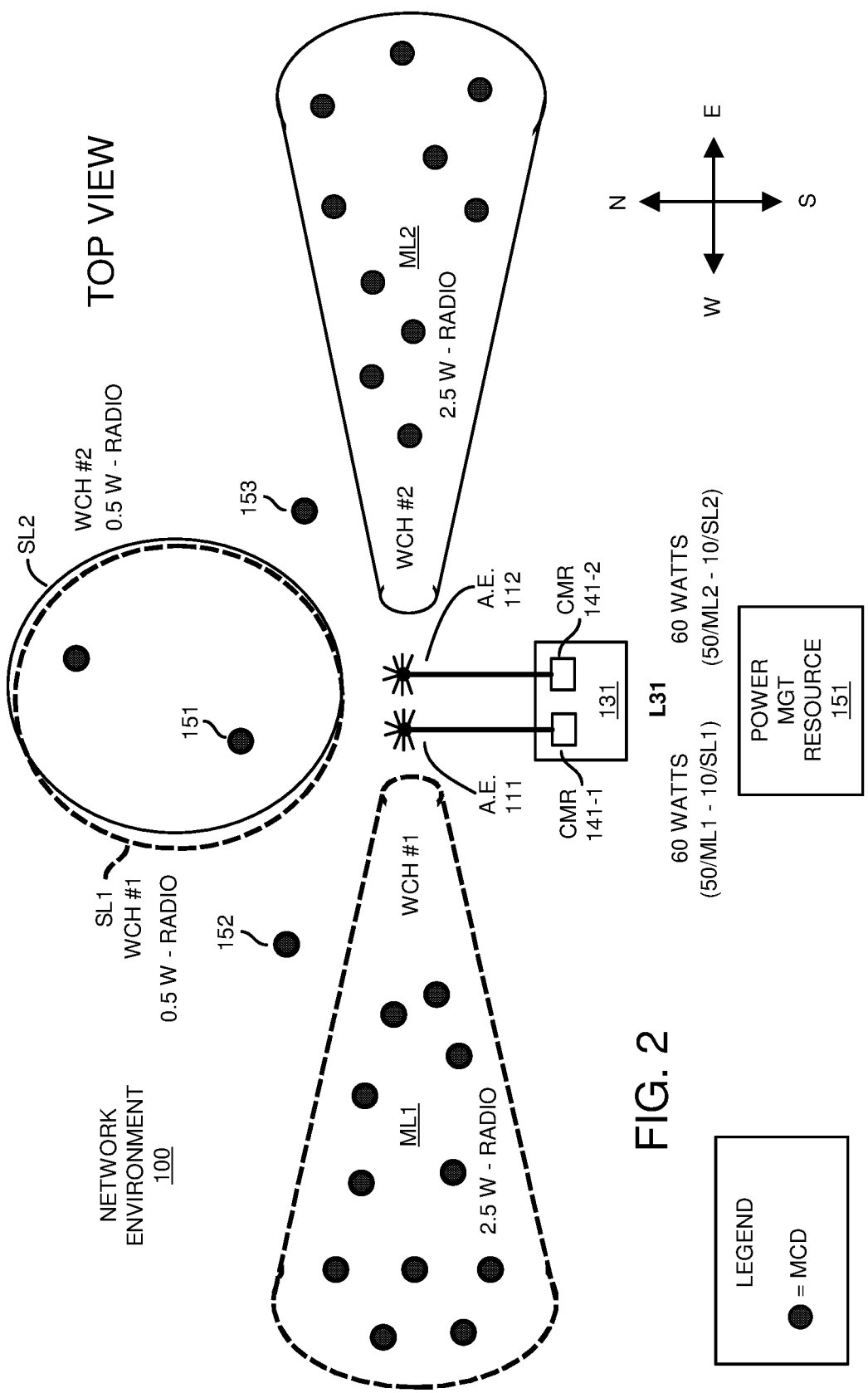
FIG. 2 is an example diagram illustrating implementation of multiple main lobes and sidelobes to support wireless communications according to embodiments herein.

FIG. 2 is an example diagram illustrating implementation of multiple main lobes and sidelobes to support wireless communications according to embodiments herein.

In this example embodiment, the first sidelobe wireless beam SL1 and/or second sidelobe wireless beam SL2 provide connectivity to any suitable number of communication devices.

For example, via carrier aggregation, including use of wireless channel WCH #1 provided by sidelobe wireless beam SL1 and wireless channel WCH #2 provided by sidelobe wireless beam SL2, the mobile communication device 151 (or any other mobile communication devices residing in the combination of sidelobe wireless beam SL1 and sidelobe wireless beam SL2) is wirelessly connected to the remote network 190 through the wireless base station 131.

As previously discussed, embodiments herein apportioning power to the communication management resources 141-1 and 141-2 as well as wireless power budgets amongst the main lobe and sidelobes of each communication system.

For example, the first sidelobe wireless beam SL1 supports a first number of mobile communication devices (such as 2); the first main lobe wireless beam ML1 supports a second number of mobile communication devices (such as 11). In such an instance, the power management resource 151 (such as communication management hardware) controls a magnitude of a power level of the first sidelobe wireless beam SL1 with respect to the first main lobe ML1 depending on a ratio of the first number of mobile communication devices (2) with respect to second number of mobile communication devices (11).

More specifically, assume that 120 watts of power is available to the wireless base station 131. In such an instance, the power management resource 151 allocates 60 watts of power to the communication management resource 141-1 and 60 watts of energy to communication management resource 141-2. Assume that the communication management resource 141-1 has a budget of up to 3 watts of wireless energy to support main lobe wireless beam ML1 and sidelobe wireless beam SL1. The balance of 57 watts of power is used to power circuitry (such as for base-band processing) associated with the communication management resource 141-1. Assume further that the communication management resource 141-2 has a budget of up to 3 watts of wireless energy to support main lobe wireless beam ML2 and sidelobe wireless beam SL2. The balance of 57 watts of power is used to power circuitry (such as for base-band processing) associated with the communication management resource 141-2.

In one embodiment, the communication management resource 141-1 determines how to split the available 3 wireless watts amongst the mobile communication devices in the region of wireless coverage provided by the main lobe wireless beam ML1 and the sidelobe wireless beam SL1. The communication management resource 141-1 detects 10 mobile communication devices in the main lobe wireless beam ML1 and 2 mobile devices in the sidelobe wireless beam SL1. Based on such information, the communication management resource 141-1 apportions 2/12 (# of mobile communication devices in the sidelobe wireless beam SL1/ total number of mobile communication devices in both sidelobe SL1 and main lobe ML1) of the available wireless energy 3 watts to transmit the sidelobe wireless beam SL1; the communication management resource 141-1 apportions 10/12 (# of mobile communication devices in the main lobe wireless beam ML1/total number of mobile communication devices in both sidelobe SL1 and main lobe ML1) of the available wireless energy 3 watts to transmit the main lobe wireless beam ML1.

Thus, in this example embodiment, the sidelobe wireless beam SL1 supports a wireless transmit level of 0.5 watts; the main lobe wireless beam ML1 supports a wireless transmit level of 2.5 watts. In such an instance, approximately 10 watts of the total allocated 60 watts of power to communication management resource 141-1 is consumed by the communication management resource 141-1 to manage wireless communications associated with the 2 mobile communication devices in the sidelobe wireless beam SL1; approximately 50 watts of the total allocated 60 watts of power to communication management resource 141-1 is consumed by the communication management resource 141-1 to manage wireless communications associated with the 10 mobile communication devices in the main lobe wireless beam ML1.

As previously discussed, the power management resource 151 allocates 60 watts of power to the communication management resource 141-2. Assume that the communication management resource 141-2 has a budget of up to 3 watts of wireless energy to support main lobe wireless beam ML2 and sidelobe wireless beam SL2. The balance of 57 watts of power is used to power circuitry (such as for base-band processing) associated with the communication management resource 141-2.

In one embodiment, the communication management resource 141-2 determines how to split the available 3 wireless watts amongst the mobile communication devices in the region of wireless coverage provided by the main lobe wireless beam ML2 and the sidelobe wireless beam SL2. For example, the communication management resource 141-2 detects 10 mobile communication devices in the main lobe wireless beam ML2 and 2 mobile devices in the sidelobe wireless beam SL2. Based on such information, the communication management resource 141-2 apportions 2/12 (# of mobile communication devices in the sidelobe wireless beam SL2/total number of mobile communication devices in both sidelobe SL2 and main lobe ML2) of the available wireless energy 3 watts to transmit the sidelobe wireless beam SL2; the communication management resource 141-2 apportions 10/12 (# of mobile communication devices in the main lobe wireless beam ML2/total number of mobile communication devices in both sidelobe SL2 and main lobe ML2) of the available wireless energy 3 watts to transmit the main lobe wireless beam ML2.

Thus, the sidelobe wireless beam SL2 supports a wireless transmit level of 0.5 watts; the main lobe wireless beam ML2 supports a wireless transmit level of 2.5 watts. In such an instance, approximately 10 watts of the total allocated 60 watts of power to communication management resource 141-2 is consumed by the communication management resource 141-2 to manage wireless communications associated with the 2 mobile communication devices in the sidelobe wireless beam SL2; approximately 50 watts of the total allocated 60 watts of power to communication management resource 141-2 is consumed by the communication management resource 141-2 to manage wireless communications associated with the 10 mobile communication devices in the main lobe wireless beam ML2.

Figure 3:
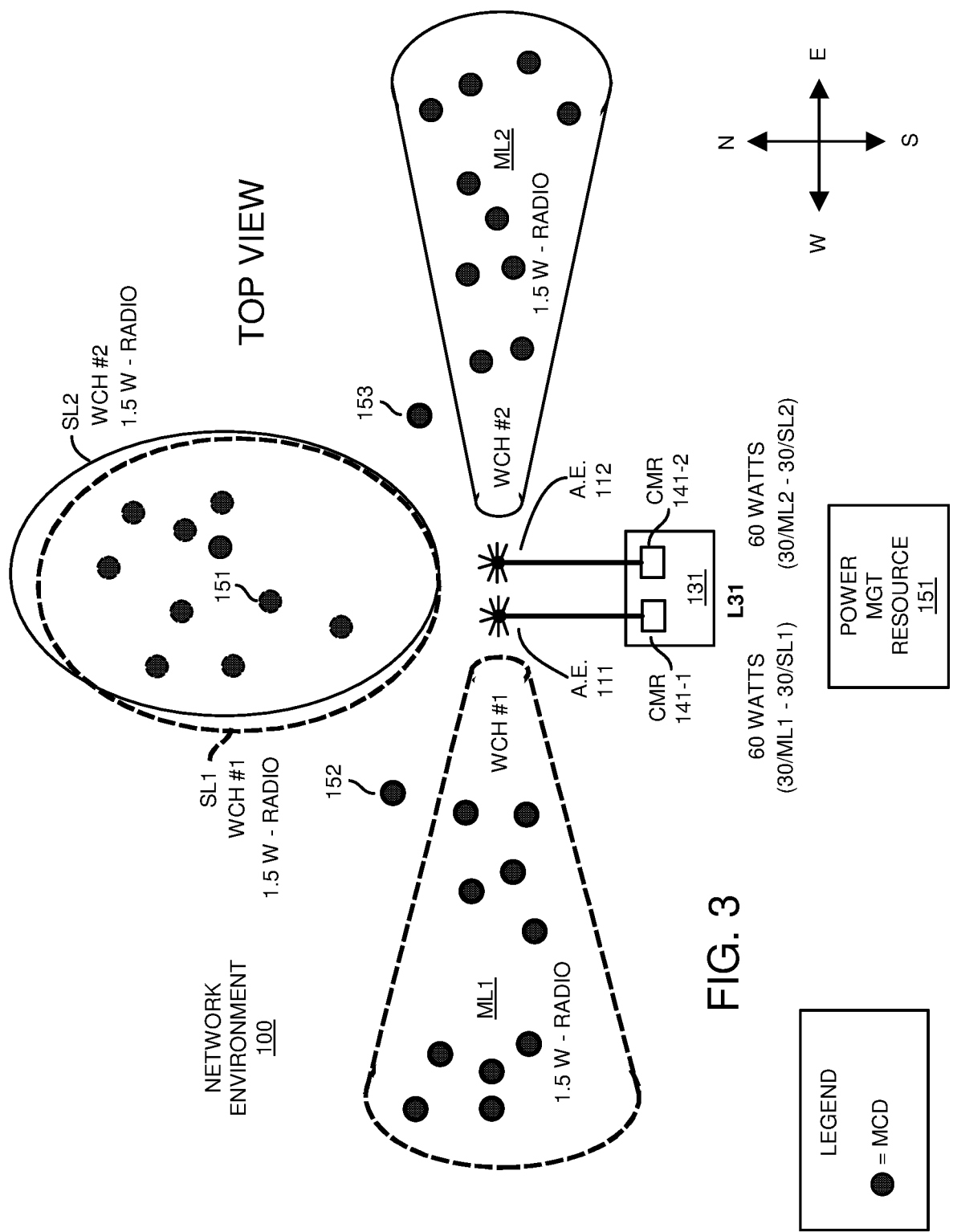
FIG. 3 is an example diagram illustrating application of power adjustments to and control of multiple main lobes and sidelobes to support wireless communications according to embodiments herein.

FIG. 3 is an example diagram illustrating application of power adjustments to multiple main lobes and sidelobes to support wireless communications according to embodiments herein.

In a similar manner as previously discussed, there is a null or reduced wireless irradiance (northwest direction) between main lobe wireless beam ML1 and the sidelobe wireless beam SL1. In such an instance, the mobile communication device 152 is unable to use wireless channel WCH #1 or wireless channel WCH #2. There is a null or reduced wireless irradiance (northeast direction) between main lobe wireless beam ML2 and the sidelobe wireless beam SL2. In such an instance, the mobile communication device 153 is unable to use wireless channel WCH #1 or wireless channel WCH #2.

In this example embodiment, the number of mobile communication devices supported by the sidelobe wireless beam SL1 and sidelobe wireless beam SL2 increases to 10 mobile communication devices.

As previously discussed, embodiments herein include apportioning power to the communication management resources 141-1 and 141-2 as well as wireless power amongst the main lobe and sidelobes of each communication system.

More specifically, the power management resource 151 allocates 60 watts of power to the communication management resource 141-1 and 60 watts of energy to communication management resource 141-2. Assume again that the communication management resource 141-1 has a budget of up to 3 watts of wireless energy to support main lobe wireless beam ML1 and sidelobe wireless beam SL1. The balance of 57 watts of power is used to power circuitry (such as for base-band processing) associated with the communication management resource 141-1. Assume further that the communication management resource 141-2 has a budget of up to 3 watts of wireless energy to support main lobe wireless beam ML2 and sidelobe wireless beam SL2. The balance of 57 watts of power is used to power circuitry (such as for base-band processing) associated with the communication management resource 141-2.

In one embodiment, the communication management resource 141-1 or other suitable entity determines how to split the available 3 wireless watts amongst the mobile communication devices in the regions of wireless coverage provided by the main lobe wireless beam ML1 and the sidelobe wireless beam SL1. The communication management resource 141-1 detects 10 mobile communication devices in the main lobe wireless beam ML1 and 10 mobile devices in the sidelobe wireless beam SL1.

Based on such information, the communication management resource 141-1 apportions 10/20 (# of mobile communication devices in the sidelobe wireless beam SL1/total number of mobile communication devices in both sidelobe SL1 and main lobe ML1) of the available wireless energy 3 watts to transmit the sidelobe wireless beam SL1; the communication management resource 141-1 apportions 10/20 (# of mobile communication devices in the sidelobe wireless beam ML1/total number of mobile communication devices in both sidelobe SL1 and main lobe ML1) of the available wireless energy 3 watts to transmit the sidelobe wireless beam ML1.

Thus, the sidelobe wireless beam SL1 supports a wireless transmit level of 1.5 watts of wireless energy; the main lobe wireless beam ML1 supports a wireless transmit level of 1.5 watts of wireless energy. In such an instance, approximately 30 watts of the total allocated 60 watts of power to communication management resource 141-1 is consumed by the communication management resource 141-1 to manage wireless communications associated with the 10 mobile communication devices in the sidelobe wireless beam SL1; approximately 30 watts of the total allocated 60 watts of power to communication management resource 141-1 is consumed by the communication management resource 141-1 to manage wireless communications associated with the 10 mobile communication devices in the main lobe wireless beam ML1.

As previously discussed, the power management resource 151 allocates 60 watts of power to the communication management resource 141-2. Assume that the communication management resource 141-2 has a budget of up to 3 watts of wireless energy to support main lobe wireless beam ML2 and sidelobe wireless beam SL2. The balance of 57 watts of power is used to power circuitry (such as for base-band processing) associated with the communication management resource 141-2.

In one embodiment, the communication management resource 141-2 determines how to split the available 3 wireless watts amongst the mobile communication devices in the region of wireless coverage provided by the main lobe wireless beam ML2 and the sidelobe wireless beam SL2. The communication management resource 141-2 detects 10 mobile communication devices in the main lobe wireless beam ML2 and 10 mobile devices in the sidelobe wireless beam SL2. Based on such information, the communication management resource 141-2 apportions 10/20 (# of mobile communication devices in the sidelobe wireless beam SL2/ total number of mobile communication devices in both sidelobe SL2 and main lobe ML2) of the available wireless energy 3 watts to transmit the sidelobe wireless beam SL2; the communication management resource 141-2 apportions 10/20 (# of mobile communication devices in the sidelobe wireless beam ML2/total number of mobile communication devices in both sidelobe SL2 and main lobe ML2) of the available wireless energy 3 watts to transmit the sidelobe wireless beam ML2.

Thus, the sidelobe wireless beam SL2 supports a wireless transmit level of 1.5 watts of wireless energy; the main lobe wireless beam ML2 supports a wireless transmit level of 1.5 watts of wireless energy. In such an instance, approximately 30 watts of the total allocated 60 watts of power to communication management resource 141-2 is consumed by the communication management resource 141-2 to manage wireless communications associated with the 10 mobile communication devices in the sidelobe wireless beam SL2; approximately 30 watts of the total allocated 60 watts of power to communication management resource 141-2 is consumed by the communication management resource 141-2 to manage wireless communications associated with the 10 mobile communication devices in the main lobe wireless beam ML2.

As further discussed below, the number of multicast stream supported by the main lobe wireless beam ML1 may decrease over time. In such an instance, the communication management resource 141-1 adjusts control of the main lobe wireless beam ML1 and the sidelobe wireless beam SL1 to accommodate the change.

Figure 4:
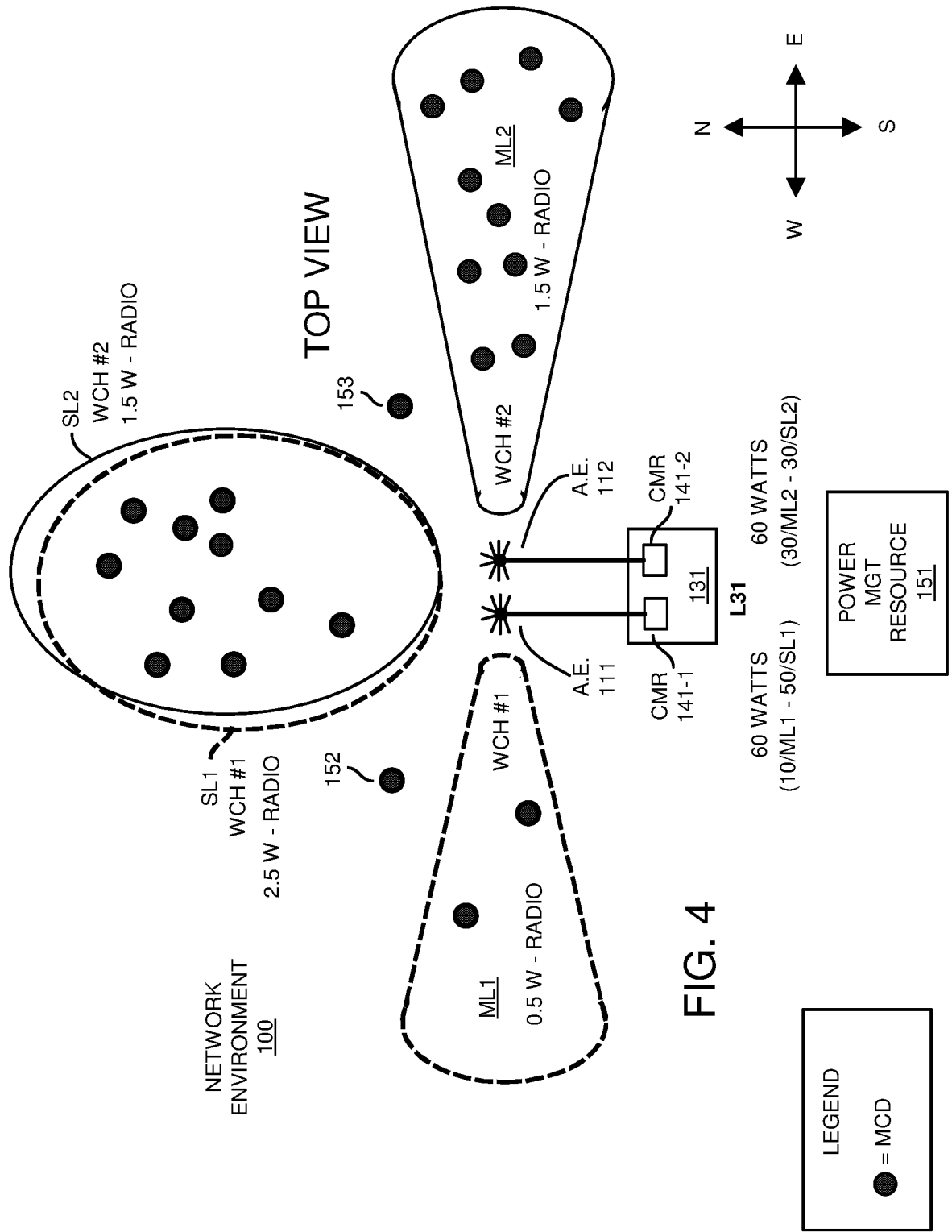
FIG. 4 is an example diagram illustrating application of power adjustments to and control of multiple main lobes and sidelobes to support wireless communications according to embodiments herein.

FIG. 4 is an example diagram illustrating application of power adjustments to multiple main lobes and sidelobes to support wireless communications according to embodiments herein.

In a similar manner as previously discussed, there is a null or reduced wireless irradiance (northwest direction from wireless base station 131) between main lobe wireless beam ML1 and the sidelobe wireless beam SL1. In such an instance, the mobile communication device 152 is unable to use wireless channel WCH #1 or wireless channel WCH #2. There is a null or reduced wireless irradiance (northeast direction from wireless base station 131) between main lobe wireless beam ML2 and the sidelobe wireless beam SL2. In such an instance, the mobile communication device 153 is unable to use wireless channel WCH #1 or wireless channel WCH #2.

In this example embodiment, the number of mobile communication devices supported by the sidelobe wireless beam SL1 and sidelobe wireless beam SL2 stays at 10 mobile communication devices. The number of mobile communication devices provided wireless access via main lobe wireless beam ML1 changes from 10 mobile communication devices to 2 mobile communication devices.

As previously discussed, embodiments herein apportioning power to the communication management resources 141-1 and 141-2 as well as wireless power amongst the main lobe and sidelobes of each communication system.

For example, the first sidelobe wireless beam SL1 supports a first number of mobile communication devices (such as 10); the first main lobe wireless beam ML1 supports a second number of mobile communication devices (such as 2). In such an instance, the power management resource 151 (such as communication management hardware) controls a magnitude of a power level of the first sidelobe wireless beam SL1 with respect to the first main lobe wireless beam ML1 depending on a ratio of the first number of mobile communication devices (2) with respect to second number of mobile communication devices (10).

More specifically, as previously discussed, the power management resource 151 allocates 60 watts of power to the communication management resource 141-1 and 60 watts of energy to communication management resource 141-2. Assume again that the communication management resource 141-1 has a budget of up to 3 watts of wireless energy to support main lobe wireless beam ML1 and sidelobe wireless beam SL1. The balance of 57 watts of power is used to power circuitry (such as for base-band processing) associated with the communication management resource 141-1. Assume further that the communication management resource 141-2 has a budget of up to 3 watts of wireless energy to support main lobe wireless beam ML2 and sidelobe wireless beam SL2. The balance of 57 watts of power is used to power circuitry (such as for base-band processing) associated with the communication management resource 141-2.

In one embodiment, the communication management resource 141-1 determines how to split the available 3 wireless watts amongst the mobile communication devices in the region of wireless coverage provided by the main lobe wireless beam ML1 and the sidelobe wireless beam SL1. The communication management resource 141-1 detects 2 mobile communication devices in the main lobe wireless beam ML1 and 10 mobile devices in the sidelobe wireless beam SL1. Based on such information, the communication management resource 141-1 apportions 2/12 (# of mobile communication devices in the sidelobe wireless beam SL1/ total number of mobile communication devices in both sidelobe SL1 and main lobe ML1) of the available wireless energy 3 watts to transmit the sidelobe wireless beam SL1; the communication management resource 141-1 apportions 10/12 (# of mobile communication devices in the sidelobe wireless beam ML1/total number of mobile communication devices in both sidelobe SL1 and main lobe ML1) of the available wireless energy 3 watts to transmit the main lobe wireless beam ML1.

Thus, in this example embodiment, the sidelobe wireless beam SL1 supports a wireless transmit level of 2.5 watts of wireless energy; the main lobe wireless beam ML1 supports a wireless transmit level of 0.5 watts of wireless energy. In such an instance, approximately 50 watts of the total allocated 60 watts of power to communication management resource 141-1 is consumed by the communication management resource 141-1 to manage wireless communications associated with the 10 mobile communication devices in the sidelobe wireless beam SL1; approximately 10 watts of the total allocated 60 watts of power to communication management resource 141-1 is consumed by the communication management resource 141-1 to manage wireless communications associated with the 10 mobile communication devices in the main lobe wireless beam ML1.

As previously discussed, the power management resource 151 allocates 60 watts of power to the communication management resource 141-2. Assume that the communication management resource 141-2 has a budget of up to 3 watts of wireless energy to support main lobe wireless beam ML2 and sidelobe wireless beam SL2. The balance of 57 watts of power is used to power circuitry (such as for base-band processing) associated with the communication management resource 141-2.

In one embodiment, the communication management resource 141-2 determines how to split the available 3 wireless watts amongst the mobile communication devices in the region of wireless coverage provided by the main lobe wireless beam ML2 and the sidelobe wireless beam SL2. The communication management resource 141-2 detects 10 mobile communication devices in the main lobe wireless beam ML2 and 10 mobile devices in the sidelobe wireless beam SL2. Based on such information, the communication management resource 141-2 apportions 10/20 (# of mobile communication devices in the sidelobe wireless beam SL2/ total number of mobile communication devices in both sidelobe SL2 and main lobe ML2) of the available wireless energy 3 watts to transmit the sidelobe wireless beam SL2; the communication management resource 141-2 apportions 10/20 (# of mobile communication devices in the sidelobe wireless beam ML2/total number of mobile communication devices in both sidelobe SL2 and main lobe ML2) of the available wireless energy 3 watts to transmit the main lobe wireless beam ML2.

Thus, the sidelobe wireless beam SL2 supports a wireless transmit level of 1.5 watts of wireless energy; the main lobe wireless beam ML2 supports a wireless transmit level of 1.5 watts of wireless energy. In such an instance, approximately 30 watts of the total allocated 60 watts of power to communication management resource 141-2 is consumed by the communication management resource 141-2 to manage wireless communications associated with the 10 mobile communication devices in the sidelobe wireless beam SL2; approximately 30 watts of the total allocated 60 watts of power to communication management resource 141-2 is consumed by the communication management resource 141-2 to manage wireless communications associated with the 10 mobile communication devices in the main lobe wireless beam ML2.

Figure 5:
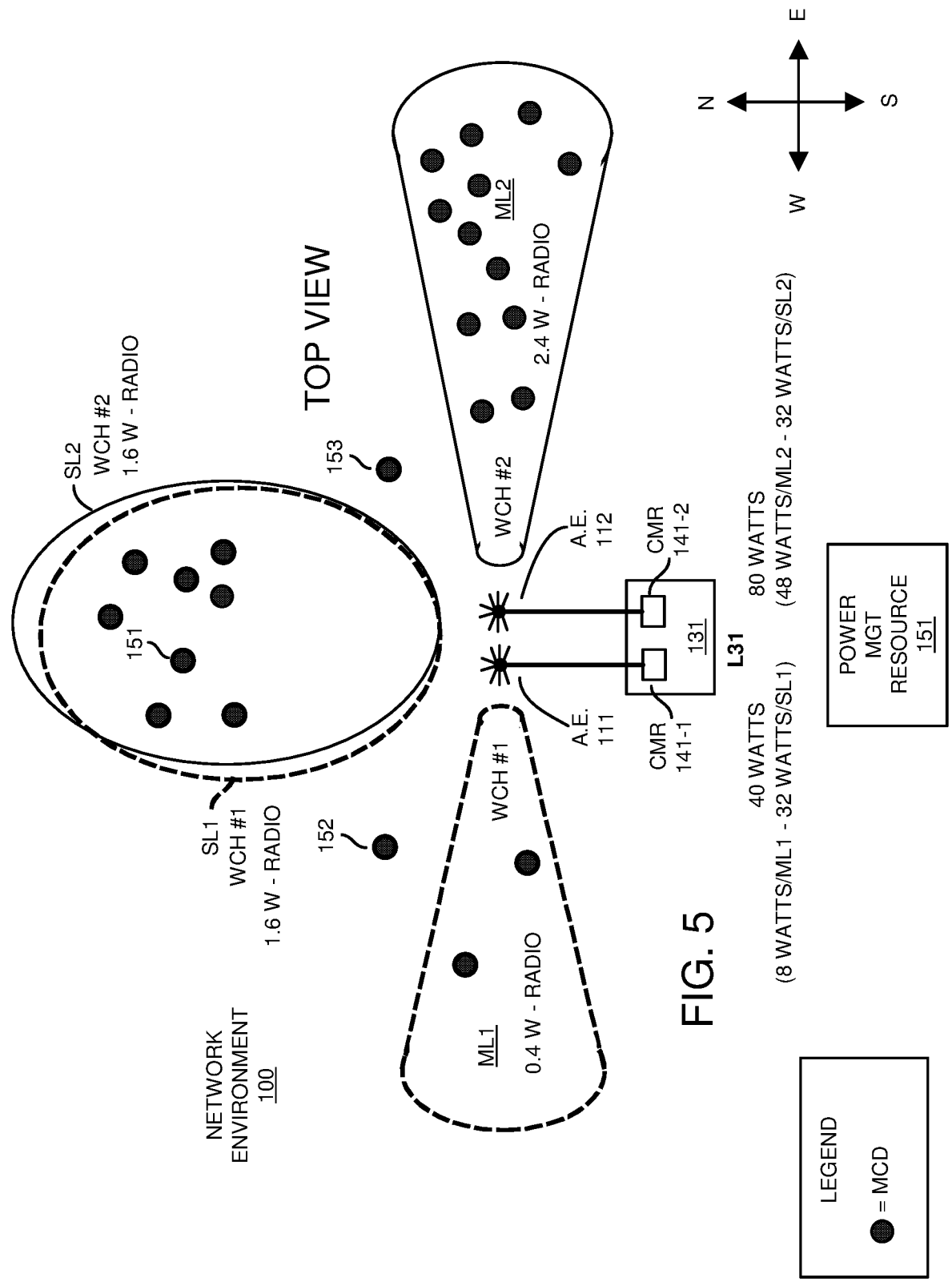
FIG. 5 is an example diagram illustrating application of power adjustments to and control of multiple main lobes and sidelobes to support wireless communications according to embodiments herein.

FIG. 5 is an example diagram illustrating application of power adjustments to multiple main lobes and sidelobes to support wireless communications according to embodiments herein.

In a similar manner as previously discussed, there is a null or reduced wireless irradiance (northwest direction from wireless base station 131) between main lobe wireless beam ML1 and the sidelobe wireless beam SL1. In such an instance, the mobile communication device 152 is unable to use wireless channel WCH #1 or wireless channel WCH #2. There is a null or reduced wireless irradiance (northeast direction from wireless base station 131) between main lobe wireless beam ML2 and the sidelobe wireless beam SL2. In such an instance, the mobile communication device 153 is unable to use wireless channel WCH #1 or wireless channel WCH #2.

In accordance with still further example embodiments, the power management resource 151 can be configured to apportion allocation of the 120 watts to the communication management resource 141-1 and communication management resource 141-2 depending on a number of mobile communication devices supported by the each of them.

For example, in this example embodiment, via the main lobe wireless beam ML1 and the sidelobe wireless beam SL1, the communication management resource 141-1 supports 2+10 mobile communication devices. Via the main lobe wireless beam ML2 and the sidelobe wireless beam SL2, the communication management resource 141-2 supports 10+12 mobile communication devices.

The communication management hardware (such as power management resource 151) apportions first power such as 40 watts to the first communication management resource 141-1 and the second communication management hardware 141-2 depending on a ratio of a number of communication devices supported by the first antenna hardware 111 with respect to a number of communication devices supported by the second antenna hardware 112. In one embodiment, the first antenna hardware and the second antenna hardware reside in a same wireless base station 131. Alternatively, the antenna hardware 111 is disparately located with respect to the antenna hardware 112.

The power management resource 151 determines the allocation of 40 watts to communication management resource 141-1 based on the following: [(total # mobile communication devices support by SL1 and ML1)/(total # mobile communication devices support by SL1, ML1, SL2, and ML2)]×120 watts=[(2+8)/(2+8+8+12)]×120=40 watts.

The power management resource 151 determines the allocation of 80 watts to communication management resource 141-2 based on the following: [(total #mobile communication devices support by SL2 and ML2)/(total # mobile communication devices support by SL1, ML1, SL2, and ML2)]×120 watts=[(8+12)/(2+8+8+12)]×120=80 watts.

In a similar manner as previously discussed, embodiments herein apportioning power to the communication management resources 141-1 and 141-2 as well as wireless power amongst the main lobe and sidelobes of each communication system.

For example, the first sidelobe wireless beam SL1 supports a first number of mobile communication devices (such as 10); the first main lobe wireless beam ML1 supports a second number of mobile communication devices (such as 2). In such an instance, the power management resource 151 (such as communication management hardware) controls a magnitude of a power level of the first sidelobe wireless beam SL1 with respect to the first main lobe ML1 depending on a ratio of the first number of mobile communication devices (2) with respect to second number of mobile communication devices (10).

More specifically, as previously discussed, the power management resource 151 allocates 40 watts of power to the communication management resource 141-1 and 80 watts of energy to communication management resource 141-2.

In such an instance, the communication management resource 141-1 has a budget of up to 2 watts of wireless energy to support main lobe wireless beam ML1 and sidelobe wireless beam SL1. The balance of 38 watts of power is used to power circuitry (such as for base-band processing) associated with the communication management resource 141-1. Assume further that the communication management resource 141-2 has a budget of up to 4 watts of wireless energy to support main lobe wireless beam ML2 and sidelobe wireless beam SL2. The balance of 76 watts of power is used to power circuitry (such as for base-band processing) associated with the communication management resource 141-2.

In one embodiment, the communication management resource 141-1 determines how to split the available 2 wireless watts amongst the mobile communication devices in the region of wireless coverage provided by the main lobe wireless beam ML1 and the sidelobe wireless beam SL1. The communication management resource 141-1 detects 2 mobile communication devices in the main lobe wireless beam ML1 and 8 mobile devices in the sidelobe wireless beam SL1. Based on such information, the communication management resource 141-1 apportions 2/10 (# of mobile communication devices in the sidelobe wireless beam SL1/ total number of mobile communication devices in both sidelobe SL1 and main lobe ML1) of the available wireless energy 2 watts to transmit the sidelobe wireless beam SL1; the communication management resource 141-1 apportions 8/10 (# of mobile communication devices in the sidelobe wireless beam ML1/total number of mobile communication devices in both sidelobe SL1 and main lobe ML1) of the available wireless energy 2 watts to transmit the sidelobe wireless beam ML1.

Thus, the sidelobe wireless beam SL1 supports a wireless transmit level of 1.6 watts of wireless energy; the main lobe wireless beam ML1 supports a wireless transmit level of 0.4 watts of wireless energy. In such an instance, approximately 32 watts of the total allocated 40 watts of power to communication management resource 141-1 is consumed by the communication management resource 141-1 to manage wireless communications associated with the 8 mobile communication devices in the sidelobe wireless beam SL1; approximately 8 watts of the total allocated 40 watts of power to communication management resource 141-1 is consumed by the communication management resource 141-1 to manage wireless communications associated with the 2 mobile communication devices in the main lobe wireless beam ML1.

As previously discussed, the power management resource 151 allocates 80 watts of power to the communication management resource 141-2. Assume that the communication management resource 141-2 has a budget of up to 4 watts of wireless energy to support main lobe wireless beam ML2 and sidelobe wireless beam SL2. The balance of 76 watts of power is used to power circuitry (such as for base-band processing) associated with the communication management resource 141-2.

In one embodiment, the communication management resource 141-2 determines how to split the available 4 wireless watts amongst the mobile communication devices in the region of wireless coverage provided by the main lobe wireless beam ML2 and the sidelobe wireless beam SL2. For example, the communication management resource 141-2 detects 12 mobile communication devices in the main lobe wireless beam ML2 and 8 mobile devices in the sidelobe wireless beam SL2. Based on such information, the communication management resource 141-2 apportions 8/20 (# of mobile communication devices in the sidelobe wireless beam SL2/total number of mobile communication devices in both sidelobe SL2 and main lobe ML2) of the available wireless energy 4 watts to transmit the sidelobe wireless beam SL2; the communication management resource 141-2 apportions 12/20 (# of mobile communication devices in the main lobe wireless beam ML2/total number of mobile communication devices in both sidelobe SL2 and main lobe ML2) of the available wireless energy 4 watts to transmit the main lobe wireless beam ML2.

Thus, the sidelobe wireless beam SL2 supports a wireless transmit level of 1.6 watts of wireless energy; the main lobe wireless beam ML2 supports a wireless transmit level of 2.4 watts of wireless energy. In such an instance, approximately 32 watts of the total allocated 80 watts of power to communication management resource 141-2 is consumed by the communication management resource 141-2 to manage wireless communications associated with the 8 mobile communication devices in the sidelobe wireless beam SL2; approximately 48 watts of the total allocated 80 watts of power to communication management resource 141-2 is consumed by the communication management resource 141-2 to manage wireless communications associated with the 12 mobile communication devices in the main lobe wireless beam ML2.

Figure 6:
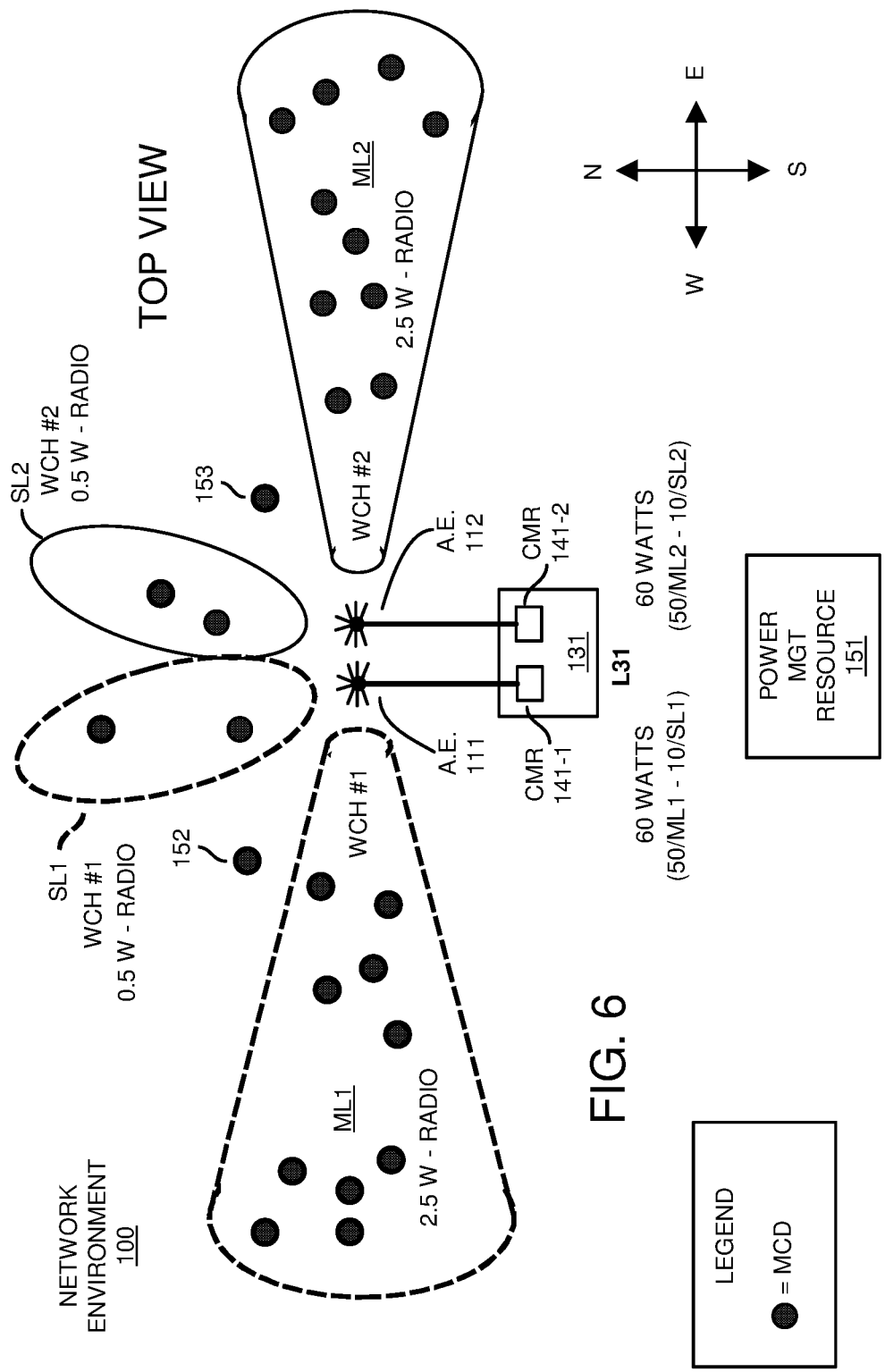
FIG. 6 is an example diagram illustrating application of power adjustments to and control of multiple main lobes and sidelobes to support wireless communications according to embodiments herein.

FIG. 6 is an example diagram illustrating application of power adjustments to multiple main lobes and sidelobes to support wireless communications according to embodiments herein.

In a similar manner as previously discussed, there is a null or reduced wireless irradiance (northwest direction from wireless base station 131) between main lobe wireless beam ML1 and the sidelobe wireless beam SL1. In such an instance, the mobile communication device 152 is unable to use wireless channel WCH #1 or wireless channel WCH #2. There is a null or reduced wireless irradiance (northeast direction from wireless base station 131) between main lobe wireless beam ML2 and the sidelobe wireless beam SL2. In such an instance, the mobile communication device 153 is unable to use wireless channel WCH #1 or wireless channel WCH #2.

This example embodiment illustrates how the sidelobe wireless beam SL1 does not overlap with the region of wireless coverage provided by the sidelobe wireless beam SL2. For example, main lobe wireless beam ML1 supports 10 mobile communication devices, sidelobe wireless beam SL1 supports 2 mobile communication devices, main lobe wireless beam ML2 supports 10 mobile communication devices, and sidelobe wireless beam SL2 supports 2 mobile communication devices. The mobile communication devices in the region of wireless coverage provided by the sidelobe wireless beam SL1 and the region of wireless coverage of sidelobe wireless beam SL2 cannot implement carrier aggregation because the sidelobe wireless beams do not overlap each other. Accordingly, FIG. 6 illustrates a non-carrier aggregation mode of operation.

As further discussed below in FIG. 7, in response to detecting additional mobile communication devices in the sidelobe wireless beam SL1 and/or sidelobe wireless beam SL2, one or more of the communication management resources 141-1 and 141-2 can be configured to increase a wireless transmit power level of communicating in the sidelobe wireless beams SL1 and SL2.

Figure 7:
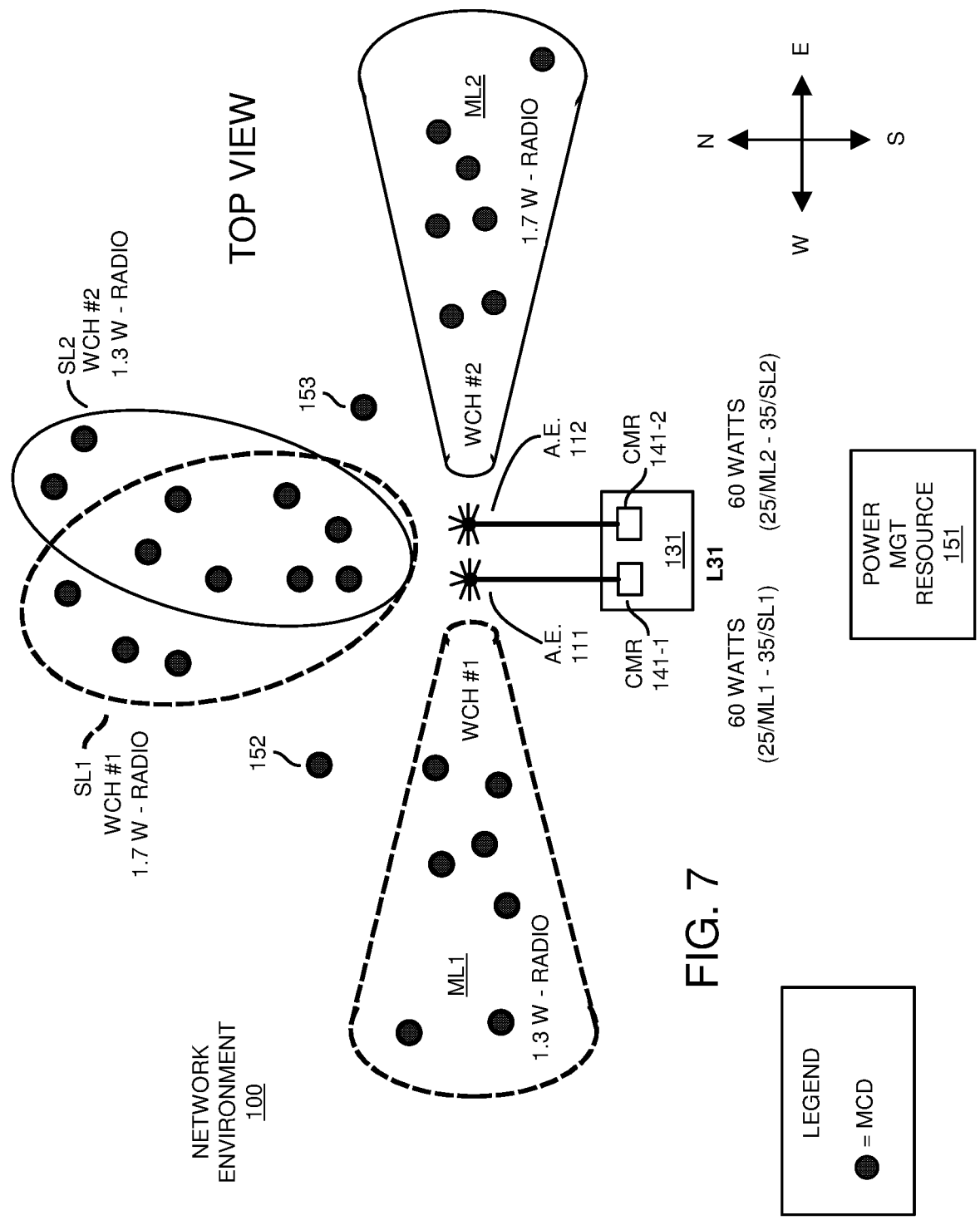
FIG. 7 is an example diagram illustrating application of power adjustments to and control of multiple main lobes and sidelobes to support wireless communications according to embodiments herein.

FIG. 7 is an example diagram illustrating application of power adjustments to multiple main lobes and sidelobes to support wireless communications according to embodiments herein.

In a similar manner as previously discussed, there is a null or reduced wireless irradiance (northwest direction from wireless base station 131) between main lobe wireless beam ML1 and the sidelobe wireless beam SL1. In such an instance, the mobile communication device 152 is unable to use wireless channel WCH #1 or wireless channel WCH #2. There is a null or reduced wireless irradiance (northeast direction from wireless base station 131) between main lobe wireless beam ML2 and the sidelobe wireless beam SL2. In such an instance, the mobile communication device 153 is unable to use wireless channel WCH #1 or wireless channel WCH #2.

As shown, further embodiments herein include, via the communication management resource 141-1 and 141-2, adjusting a power level of transmitting the first sidelobe wireless beam SL1 and/or second sidelobe wireless beam SL2 in response to detecting an increase in the number of mobile communication devices in the northerly direction with respect to the wireless base station 131.

For example, in this example embodiment, the communication management resource 141-1 detects an increase in the number of mobile communication devices in the sidelobe wireless beam SL1. In such an instance, in response to the communication management resource 141-1 detecting an increase in a number of mobile communication devices, the communication management resource 141-1 increases the power level of producing the sidelobe wireless beam SL1. As shown, this angularly increases a region of wireless coverage associated with the sidelobe wireless beam SL1 to encompass more mobile communication devices than in FIG. 6.

Additionally, in this example embodiment of FIG. 7, the communication management resource 141-2 detects an increase in the number of mobile communication devices in the sidelobe wireless beam SL2. In such an instance, in response to the communication management resource 141-2 detecting an increase in a number of mobile communication devices, the communication management resource 141-2 increases the power level of producing the sidelobe wireless beam SL2. As shown, this angularly increases a region of wireless coverage associated with the sidelobe wireless beam SL2 to encompass more mobile communication devices.

The overall result of the increase in sidelobe wireless beam SL1 and sidelobe wireless beam SL2 increases the region of overlap such that the mobile communication devices in the overlap region are able to implement carrier aggregation. More specifically, mobile communication devices in the overlap region are able to use both wireless channel WCHH #1 and wireless channel WCHH #2 to communicate with the wireless base station 131 and access the remote network 190.

Thus, embodiments herein include adjusting sidelobe power transmit levels to support carrier aggregation.

Figure 8:
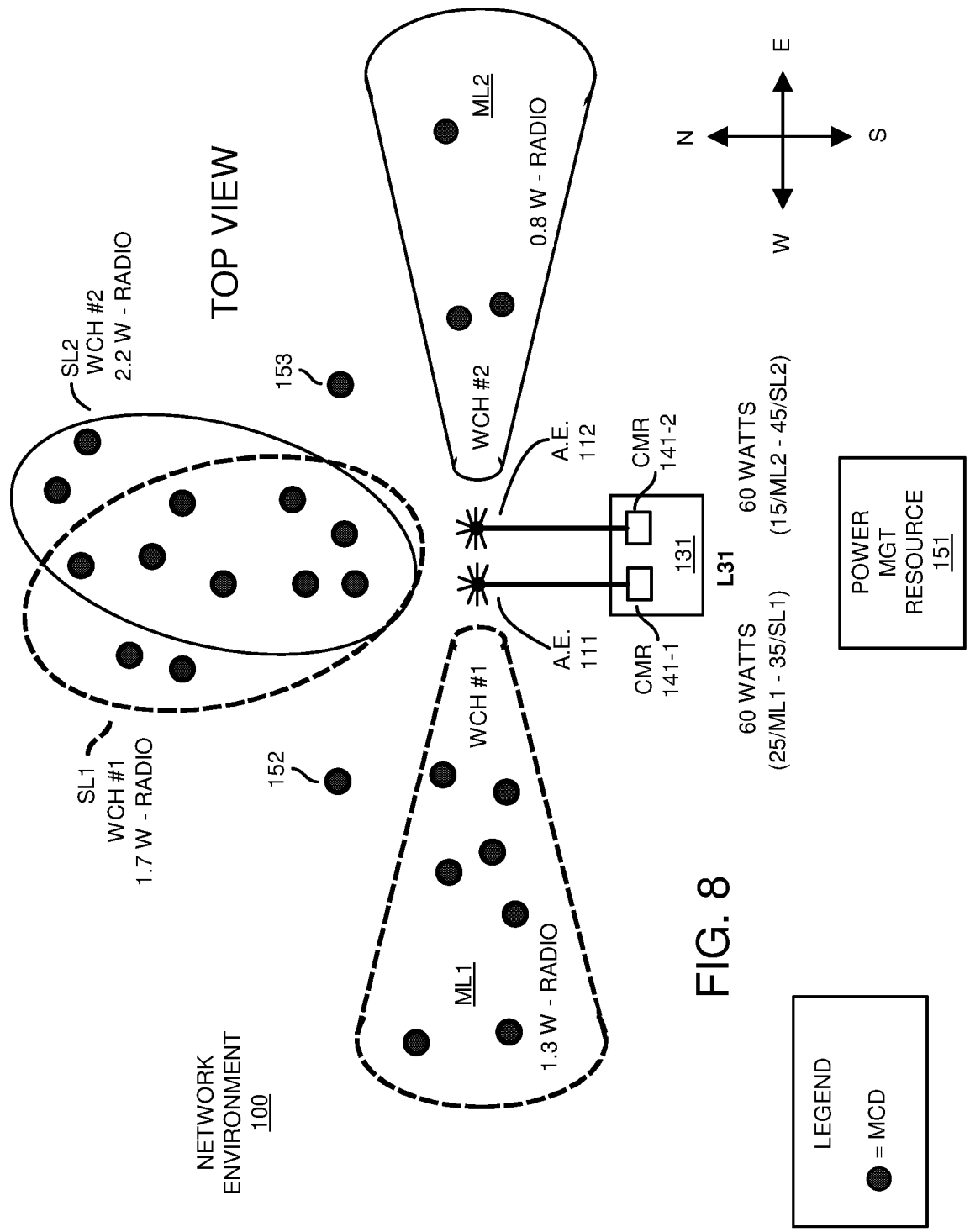
FIG. 8 is an example diagram illustrating application of power adjustments to and control of multiple main lobes and sidelobes to support wireless communications according to embodiments herein.

As further shown in FIG. 8, the number of mobile communication devices supported by the main lobe ML2 may decrease over time. In such an instance, the communication management resource 141-2 changes an apportionment of wireless energy implemented in the main lobe wireless beam ML2 and sidelobe wireless beam SL2.

FIG. 8 is an example diagram illustrating application of power adjustments to multiple main lobes and sidelobes to support wireless communications according to embodiments herein.

As shown, in a similar manner as previously discussed, the communication management resource 141-2 adjusts the apportionment of wireless energy between the main lobe wireless beam ML2 and the sidelobe wireless beam SL2 to accommodate the increase in mobile communication devices in the northerly direction.

Figure 9:
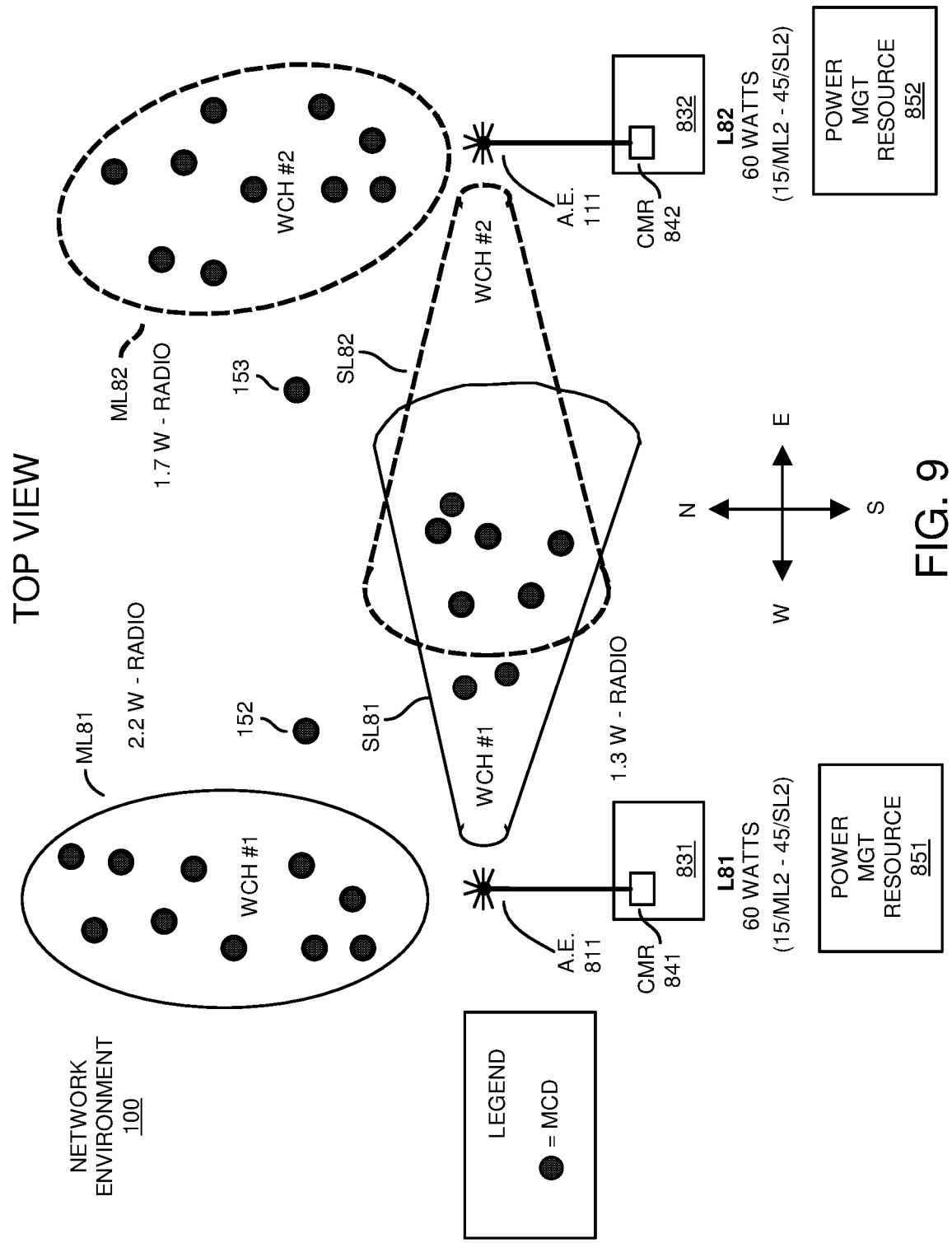
FIG. 9 is an example diagram illustrating application of power adjustments to and control of multiple main lobes and/or sidelobes to support wireless communications from two disparately located wireless base stations according to embodiments herein.

FIG. 9 is an example diagram illustrating application of power adjustments to multiple main lobes and/or sidelobes to support wireless communications from two disparately located wireless base stations according to embodiments herein.

In this example embodiment, the network environment 100 includes wireless base station 831 at location L81 and wireless base station 832 at location L82. The wireless base station 831 implements communication management resource 841 to control operation of the antenna hardware 811. The wireless base station 831 is allocated wireless channel WCH #1 to communicate in the network environment 100. The wireless base station 832 implements communication management resource 842 to control operation of the antenna hardware 812. The wireless base station 832 is allocated wireless channel WCH #2 to communicate in the network environment 100.

Transmitting the main lobe wireless beam ML81 in the northly direction from antenna hardware 811 results in generation of the sidelobe wireless beam SL81 in the easterly direction. In a similar manner as previously discussed, there is a null or reduced wireless irradiance (northeast direction) between main lobe wireless beam ML81 and the sidelobe wireless beam SL81. Transmitting the main lobe wireless beam ML82 in the northerly direction from antenna hardware 812 results in generation of the sidelobe wireless beam SL82 in the westerly direction. In a similar manner as previously discussed, there is a null or reduced wireless irradiance (northwest direction) between main lobe wireless beam ML82 and the sidelobe wireless beam SL82.

In a manner as previously discussed, any of the mobile communication devices falling in the region of wireless coverage provided by the sidelobe wireless beam SL81 are able to use wireless channel WCH #1. Any of the mobile communication devices falling in the region of wireless coverage provided by the sidelobe wireless beam SL82 are able to use wireless channel WCH #2.

Those mobile communication devices residing in both the region of wireless coverage provided by the sidelobe wireless beam SL1 and sidelobe wireless beam SL2 are able to implement carrier aggregation in which both wireless channels WCH #1 and wireless channel WCH #2 are used to communicate with different wireless base stations 831 and 832 to access the remote network 190. Thus, embodiments herein include mobile communication device carrier aggregation supported by multiple sidelobes associated with different wireless base stations.

Figure 10:
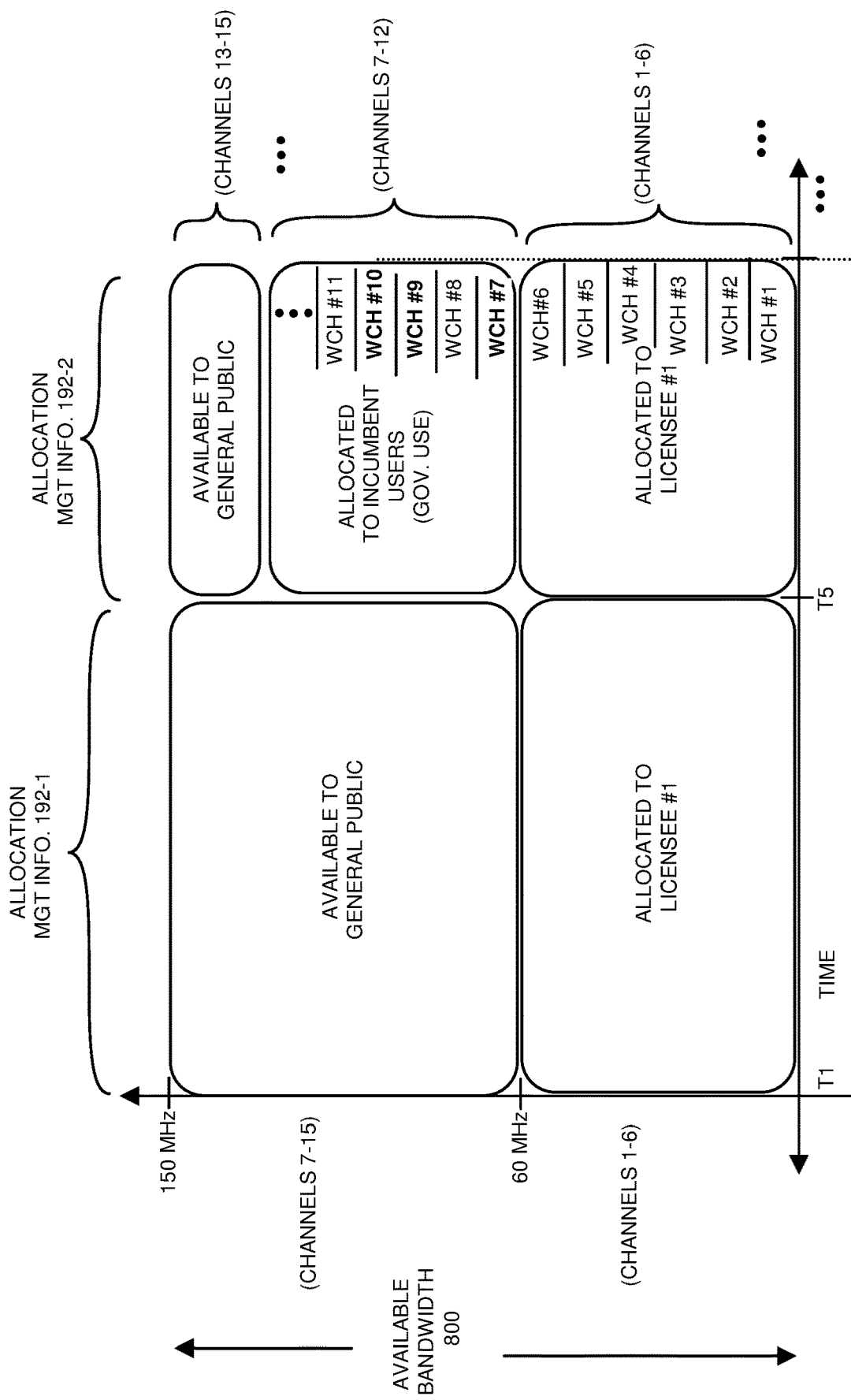
FIG. 10 is an example diagram illustrating a wireless spectrum from which wireless channels are allocated and deallocated according to embodiments herein.

FIG. 10 is an example diagram illustrating generation of dynamic channel allocation information indicating allocation of bandwidth at different tiers of a channel hierarchy according to embodiments herein.

As previously discussed, communication management resource 140 can be configured to allocate any suitable type of wireless spectrum (bandwidth, wireless channels, etc.) for use by the communication devices such as wireless base stations, customer premises equipment, etc., in the network environment 100.

In one non-limiting example embodiment, the communication management resource 140 allocates bandwidth (wireless channels) from a so-called CBRS (Citizens Band Radio System) band operating between 3.550 and 3.700 GHz (GigaHertz) (such as 150 MegaHertz or 15 wireless channels that are each 10 MHz wide).

Also, allocation management resource 140 (such as spectrum access system or other suitable entity) keeps track, at any given time, which wireless channels or portions of the multi-tier wireless spectrum or multi-tier radio band (such as CBRS band) are available in the geographical region in which the network environment 100 resides. If government use (such as via a so-called incumbent user) is detected or requested via appropriate input (such as around time T5) to the allocation management resource 140, certain channels (such as those used by the general public) are no longer available for use.

More specifically, in this example, the allocation management information 192-1 (a first instance of allocation management information) indicates that between time T1 and time T5, channels 7-15 are available to the general authorized access users (general public or low priority users) for use; channels 1-6 are available for use by licensee #1. In a manner as previously discussed, these channels are allocated for use by the wireless base stations in network environment 100.

As further shown, at or around time T5, assume that the communication management resource 140 receives input indicating use of a portion (channels 7-12) of the spectrum by an incumbent user such as the government. In such an instance, the allocation management resource 140 updates the channel allocation information such that the allocation management information 192-2 indicates that only channels 13-15 are allocated as being available to the general authorized access users; channels 7-12 are assigned for use by an incumbent entity requesting use or actually using the channels; wireless channels 1-6 are allocated for use by a first licensee. Thus, after time T5, the wireless channels 7-12 are no longer available for use by the lower priority users (i.e., general authorized access users) such as wireless base station 131 or wireless base station 431 (whichever happens to be operating at the time).

In one embodiment, in response to revocation of the allocation of wireless channels 7-12, the communication management resource 140 notifies the wireless base station 131 at or around time T5 that the wireless base station 131 is no longer able to use wireless channel #7, #8, #9, and #10 because these channels have been revoked and assigned for use by the incumbent user.

Thus, between time T1 and time T5, the wireless base station 131 uses the wireless channels #7, #8, #9, #10, etc., to provide wireless service to the communication devices. At or around time T5, the communication management resource 140 deallocates use of the wireless channels #7, #8, #9 and #10 from the wireless base station 131 in favor of use of the wireless channels #7, #8, #9, and #10 being used by or allocated to the incumbent user after time T5.

This illustrates the dynamic availability of different wireless channels bandwidth in a hierarchy as shared in network environment 100. For example, if communication management resource 140 allocates use of wireless channels #7-12 in the hierarchy of available channels to any of one or more base stations, communication devices, etc., then the communication management resource 140 must de-allocate use of such wireless channels during conditions in which a higher priority so-called incumbent user relinquishes use of wireless channels 7-12 at or around time T5. In such an instance, as previously discussed, the communication management resource 140 deallocates the wireless channels 7-12 from respective wireless stations for use instead by the incumbent user (higher priority user).

In this example embodiment as previously discussed, the allocation management resource 140 can be configured to allocate use of wireless channel WCH #1 and wireless channel WCH #2 to om wireless base stations. In response to detecting a condition that a respective one or more incumbent entity uses the respective wireless channels, the allocation management resource 140 communicates with the wireless base stations to revoke use of such wireless channels. If available, the allocation management resource 140 allocates use of different wireless channels to the wireless base stations.

FIG. 10 is an example block diagram of a computer system for implementing any of the operations as discussed herein according to embodiments herein.

Any of the resources (such as allocation management resource 140, wireless base station 131, wireless base station 132, power consumption controller 141, power consumption controller 142, communication management resource 155, power management resource 150, etc.) as discussed herein can be configured to include a respective instantiation of computer processor hardware and corresponding executable instructions to carry out the different operations as discussed herein. For example, communication management resource 140 can be configured to execute the management application 140-1 to execute operations associated with the communication management resource 140; multi-tier wireless base station 131 can be configured to execute the management application 140-1 to execute operations associated with the multi-tier wireless base station 131, etc.

As shown, computer system 1150 of the present example includes an interconnect 1111 that couples computer readable storage media 1112 such as a non-transitory type of media (i.e., any type of hardware storage medium) from which digital information is stored and retrieved, a processor 1113, I/O interface 1114, and a communications interface 1117.

I/O interface 1114 supports connectivity to repository 1180 and input resource 1192.

Computer readable storage medium 1112 can be any hardware storage device such as memory, optical storage, hard drive, floppy disk, etc. In one embodiment, the computer readable storage medium 1112 stores instructions and/or data.

As shown, computer readable storage media 1112 can be encoded with management application 140-1 (e.g., including instructions) to carry out any of the operations as discussed herein.

During operation of one embodiment, processor 1113 accesses computer readable storage media 1112 via the use of interconnect 1111 in order to launch, run, execute, interpret or otherwise perform the instructions in management application 140-1 stored on computer readable storage medium 1112. Execution of the management application 140-1 produces management process 140-2 to carry out any of the operations and/or processes as discussed herein.

Those skilled in the art will understand that the computer system 1150 can include other processes and/or software and hardware components, such as an operating system that controls allocation and use of hardware resources to communication management application 140-1.

In accordance with different embodiments, note that computer system may be or included in any of various types of devices, including, but not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1150 may reside at any location or can be included in any suitable resource in any network environment to implement functionality as discussed herein.

Figure 11:
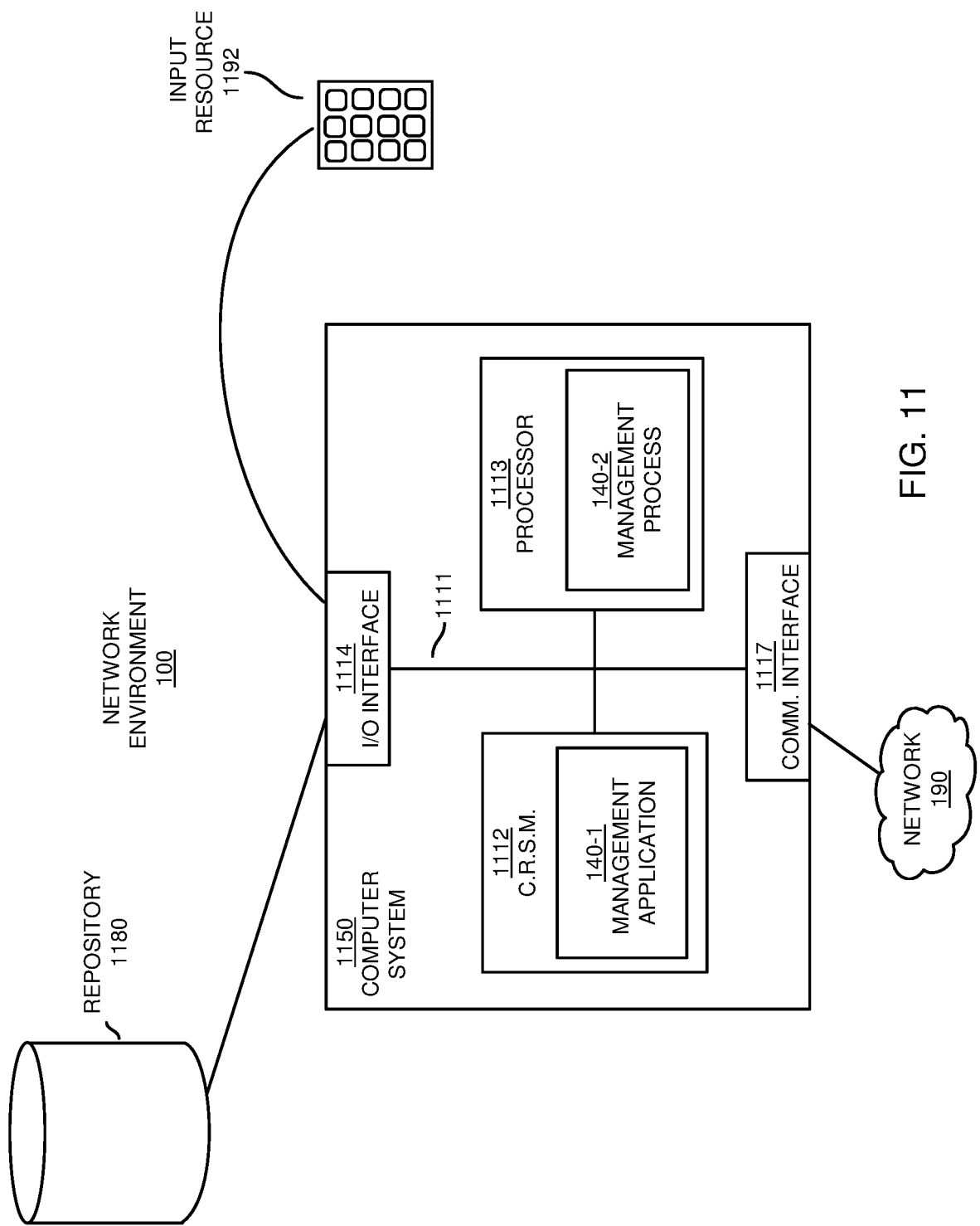
FIG. 11 is an example diagram illustrating example computer architecture operable to execute one or more operations according to embodiments herein.

Functionality supported by the different resources will now be discussed via flowcharts in FIG. 11. Note that the steps in the flowcharts below can be executed in any suitable order.

Figure 12:
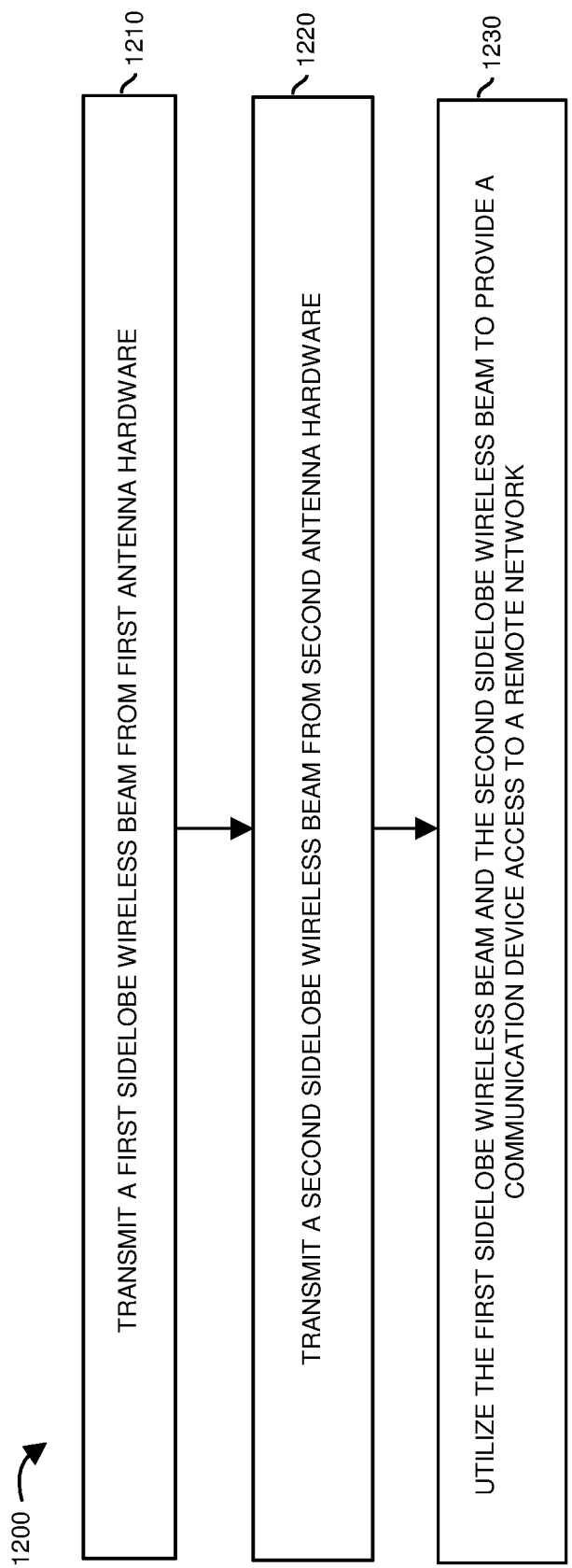
FIG. 12 is an example diagram illustrating a method according to embodiments herein.

FIG. 12 is a flowchart 1200 illustrating an example method according to embodiments. Note that there will be some overlap with respect to concepts as discussed above.

In processing operation 1210, the wireless base station 131 transmits a first sidelobe wireless beam SL1 from first antenna hardware 111.

In processing operation 1220, the wireless base station 131 transmits a second sidelobe wireless beam SL2 from second antenna hardware 112.

In processing operation 1230, the wireless base station 131 utilizes the first sidelobe wireless beam SL1 and the second sidelobe wireless beam SL2 to provide one or more communication devices access to a remote network 190.

Note again that techniques herein are well suited to support power management and multi-lobe communications in a wireless network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   transmitting a first sidelobe wireless beam from first antenna hardware;
   transmitting a second sidelobe wireless beam from second antenna hardware;
   utilizing the first sidelobe wireless beam and the second sidelobe wireless beam to provide a communication device access to a remote network;
   wherein the communication device is a first mobile communication device; and
   wherein a combination of a first portion of the first sidelobe wireless beam and a first portion of the second sidelobe wireless beam overlap in wireless coverage to provide the first mobile communication device wireless access to the remote network.

2. The method as in claim 1 further comprising:
   transmitting a first main lobe wireless beam, the first sidelobe wireless beam being a sidelobe with respect to the first main lobe wireless beam; and
   transmitting a second main lobe wireless beam, the second sidelobe wireless beam being a sidelobe with respect to the second main lobe wireless beam.

3. The method as in claim 1, wherein the first sidelobe wireless beam is transmitted at a first carrier frequency; and
   wherein the second sidelobe wireless beam is transmitted at a second carrier frequency.

4. The method as in claim 1, wherein the mobile communication device implements carrier aggregation to communicate with the remote network over both the first sidelobe wireless beam and the second sidelobe wireless beam.

5. The method as in claim 1 further comprising:
   adjusting a power level of transmitting the first sidelobe wireless beam, adjustment of the power level changing the overlap of a first wireless coverage region provided by the first sidelobe wireless beam with respect to a second wireless coverage region provided by the second sidelobe wireless beam.

6. The method as in claim 1, wherein a second portion of the first sidelobe wireless beam does not overlap with the second sidelobe wireless beam, the method further comprising:
   utilizing the second portion of the second sidelobe wireless beam to communicate with a second mobile communication device.

7. The method as in claim 6, wherein a second portion of the second sidelobe wireless beam does not overlap with the first sidelobe wireless beam, the method further comprising:
   utilizing the second portion of the second sidelobe wireless beam to communicate with a third communication device.

8. The method as in claim 1 further comprising:
   controlling a first power level of transmitting the first sidelobe wireless beam to be different than a second power level of transmitting the second sidelobe wireless beam.

9. The method as in claim 8, wherein the first sidelobe wireless beam is transmitted at a first carrier frequency; and
   wherein the second sidelobe wireless beam is transmitted at a second carrier frequency.

10. The method as in claim 1, wherein utilizing the first sidelobe wireless beam and the second sidelobe wireless beam to provide the communication device access to the remote network includes:
    adjusting an apportionment of power allocated to transmit the first sidelobe wireless beam and the second sidelobe wireless beam.

11. The method as in claim 1, wherein the first sidelobe wireless beam is transmitted in an opposite direction with respect to a direction of transmitting the second sidelobe wireless beam.

12. The method as in claim 11 further comprising:
    transmitting a first main lobe wireless beam from the first antenna hardware in a first direction, the first sidelobe wireless beam being a sidelobe with respect to the first main lobe wireless beam; and
    transmitting a second main lobe wireless beam from the second antenna hardware in a second direction, the second sidelobe wireless beam being a sidelobe with respect to the second main lobe wireless beam.

13. The method as in claim 1, wherein the first antenna hardware producing the first sidelobe wireless beam and the second antenna hardware producing the second sidelobe wireless beam are operated in a carrier aggregation mode to communicate with the communication device.

14. The method as in claim 1, wherein the communication device resides between the first antenna hardware and the second antenna hardware.

15. A system comprising:
communication management hardware operative to:
  transmit a first sidelobe wireless beam from first antenna hardware;
  transmit a second sidelobe wireless beam from second antenna hardware;
  utilize the first sidelobe wireless beam and the second sidelobe wireless beam to provide a communication device access to a remote network; and
wherein the communication management hardware is further operative to: control a first power level of transmitting the first sidelobe wireless beam and a second power level of transmitting the second sidelobe wireless beam based on a number of mobile communication devices provided access to the remote network via the first sidelobe wireless beam and the second sidelobe wireless beam.

16. The system as in claim 15, wherein the communication management hardware is further operative to:
transmit a first main lobe wireless beam, the first sidelobe wireless beam being a sidelobe with respect to the first main lobe wireless beam; and
transmit a second main lobe wireless beam, the second sidelobe wireless beam being a sidelobe with respect to the second main lobe wireless beam.

17. The system as in claim 16, wherein the first sidelobe wireless beam supports a first number of mobile communication devices;
wherein the first main lobe supports a second number of mobile communication devices; and
wherein the communication management hardware is further operative to:
  control a magnitude of a power level of the first sidelobe wireless beam with respect to the first main lobe depending on a ratio of the first number of mobile communication devices with respect to second number of mobile communication devices.

18. The system as in claim 16, wherein the communication management hardware is further operative to:
determine a first number of mobile communication devices provided wireless access to the remote network via the first sidelobe wireless beam and the first main lobe wireless beam;
determine a second number of mobile communication devices provided wireless access to the remote network via the second sidelobe wireless beam and the second main lobe wireless beam;
adjust an apportionment of power allocated to transmit the first sidelobe wireless beam and the first main lobe wireless beam versus the second sidelobe wireless beam and the second main lobe wireless beam based on the ratio.

19. The system as in claim 15, wherein the first sidelobe wireless beam is transmitted at a first carrier frequency; and wherein the second sidelobe wireless beam is transmitted at a second carrier frequency.

20. The system as in claim 15, wherein the mobile communication device is operative to implement carrier aggregation to communicate with the remote network over both the first sidelobe wireless beam and the second sidelobe wireless beam.

21. The system as in claim 15, wherein the first antenna hardware supports first communications managed by first communication management hardware;
wherein the second antenna hardware supports second communications managed by second communication management hardware; and
wherein the communication management hardware is further operative to: apportion first power to the first communication management hardware and the second communication management hardware depending on a ratio of a number of communication devices supported by the first antenna hardware with respect to a number of communication devices supported by the second antenna hardware.

22. The system as in claim 21, wherein the first antenna hardware and the second antenna hardware reside in a same wireless base station.

23. The system as in claim 15, wherein the communication management hardware is further operative to:
adjust a power level of transmitting the first sidelobe wireless beam, adjustment of the power level changing an overlap of a first wireless coverage region provided by the first sidelobe wireless beam with respect to a second wireless coverage region provided by the second sidelobe wireless beam.

24. A method comprising:
transmitting a first sidelobe wireless beam from first antenna hardware;
transmitting a second sidelobe wireless beam from second antenna hardware;
utilizing the first sidelobe wireless beam and the second sidelobe wireless beam to provide a communication device access to a remote network;
the method further comprising: transmitting a first main lobe wireless beam, the first sidelobe wireless beam being a sidelobe with respect to the first main lobe wireless beam; and
transmitting a second main lobe wireless beam, the second sidelobe wireless beam being a sidelobe with respect to the second main lobe wireless beam;
wherein the first sidelobe wireless beam supports a first number of mobile communication devices;
wherein the first main lobe supports a second number of mobile communication devices, the method further comprising:
controlling a magnitude of a power level of the first sidelobe wireless beam with respect to the first main lobe wireless beam depending on a ratio of the first number of mobile communication devices with respect to the second number of mobile communication devices.

25. A method comprising:
transmitting a first sidelobe wireless beam from first antenna hardware;
transmitting a second sidelobe wireless beam from second antenna hardware;
utilizing the first sidelobe wireless beam and the second sidelobe wireless beam to provide a communication device access to a remote network;
transmitting a first main lobe wireless beam, the first sidelobe wireless beam being a sidelobe with respect to the first main lobe wireless beam; and transmitting a second main lobe wireless beam, the second sidelobe wireless beam being a sidelobe with respect to the second main lobe wireless beam;
determining a first number of mobile communication devices provided wireless access to the remote network via the first sidelobe wireless beam and the first main lobe wireless beam;
determining a second number of mobile communication devices provided wireless access to the remote network via the second sidelobe wireless beam and the second main lobe wireless beam;
adjusting an apportionment of power allocated to transmit the first sidelobe wireless beam and the first main lobe wireless beam versus the second sidelobe wireless beam and the second main lobe wireless beam based on a ratio of the first number to the second number.

26. A method comprising:
transmitting a first sidelobe wireless beam from first antenna hardware;
transmitting a second sidelobe wireless beam from second antenna hardware;
utilizing the first sidelobe wireless beam and the second sidelobe wireless beam to provide a communication device access to a remote network; and
controlling a first power level of transmitting the first sidelobe wireless beam and a second power level of transmitting the second sidelobe wireless beam based on a number of mobile communication devices provided access to the remote network via the first sidelobe wireless beam and the second sidelobe wireless beam.

27. A method comprising:
transmitting a first sidelobe wireless beam from first antenna hardware;
transmitting a second sidelobe wireless beam from second antenna hardware;
utilizing the first sidelobe wireless beam and the second sidelobe wireless beam to provide a communication device access to a remote network;
wherein the first antenna hardware supports first communications managed by first communication management hardware; and
wherein the second antenna hardware supports second communications managed by second communication management hardware, the method further comprising:
apportioning first power to the first communication management hardware and the second communication management hardware depending on a ratio of a number of communication devices supported by the first antenna hardware with respect to a number of communication devices supported by the second antenna hardware.

28. The method as in claim 27, wherein the first antenna hardware and the second antenna hardware reside in a same wireless base station.

29. A method comprising:
transmitting a first sidelobe wireless beam from first antenna hardware;
transmitting a second sidelobe wireless beam from second antenna hardware;
utilizing the first sidelobe wireless beam and the second sidelobe wireless beam to provide a communication device access to a remote network, the method further comprising:
transmitting a first main lobe wireless beam from the first antenna hardware in a first direction, the first sidelobe wireless beam being a sidelobe with respect to the first main lobe wireless beam; and
transmitting a second main lobe wireless beam from the second antenna hardware in a second direction, the second sidelobe wireless beam being a sidelobe with respect to the second main lobe wireless beam, the second direction being different than the first direction; and
wherein the first sidelobe wireless beam and the second sidelobe wireless beam are transmitted in a third direction, the third direction being different than the first direction and the second direction.

30. A method comprising:
transmitting a first sidelobe wireless beam from first antenna hardware;
transmitting a second sidelobe wireless beam from second antenna hardware;
utilizing the first sidelobe wireless beam and the second sidelobe wireless beam to provide a communication device access to a remote network;
wherein the first antenna hardware and the second antenna hardware are operated by a first service provider producing the first sidelobe wireless beam and the second sidelobe wireless beam;
wherein the first sidelobe wireless beam and the second sidelobe wireless beam are implemented via wireless bandwidth allocated from an allocation management resource that allocates the wireless bandwidth in accordance with a tiered hierarchy of users; and
wherein the first service provider resides lower in priority in the tiered hierarchy of users than an incumbent entity in the tiered hierarchy of users.

* * * * *